(12) United States Patent
Bloom et al.

(10) Patent No.: US 6,215,579 B1
(45) Date of Patent: Apr. 10, 2001

(54) METHOD AND APPARATUS FOR MODULATING AN INCIDENT LIGHT BEAM FOR FORMING A TWO-DIMENSIONAL IMAGE

(75) Inventors: David M. Bloom, Palo Alto; Asif Godil, Mountain View, both of CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 09/104,159

(22) Filed: Jun. 24, 1998

(51) Int. Cl.$^7$ .............................. G02B 26/08; G02B 5/18; G02F 1/29

(52) U.S. Cl. .................... 359/298; 359/290; 359/291; 359/295; 359/197; 359/224; 359/318; 359/572; 359/573

(58) Field of Search ................. 359/572, 573, 359/298, 318, 290, 291, 295, 197, 224

(56) References Cited

U.S. PATENT DOCUMENTS

| | | |
|---|---|---|
| Re. 16,767 | 10/1927 | Jenkins . |
| Re. 25,169 | 5/1962 | Glenn . |
| 1,525,550 | 2/1925 | Jenkins . |
| 1,548,262 | 8/1925 | Freedman . |
| 1,814,701 | 7/1931 | Ives . |
| 2,415,226 | 2/1947 | Sziklai ................................. 178/5.4 |
| 2,783,406 | 2/1957 | Vanderhooft ........................... 313/70 |

(List continued on next page.)

FOREIGN PATENT DOCUMENTS

| | | | |
|---|---|---|---|
| 0 261 901 A2 | 3/1988 | (EP) . | |
| 0 627 644 A3 | 9/1990 | (EP) | ............................. G02B/27/00 |
| 0 417 039 A1 | 3/1991 | (EP) . | |

(List continued on next page.)

OTHER PUBLICATIONS

Rowe, D.P. et al., "Laser Beam Scanning," SPIE, vol. 2088, Oct. 5, 1993, pp. 18–26.

(List continued on next page.)

*Primary Examiner*—Georgia Epps
*Assistant Examiner*—Evelyn A. Lester
(74) *Attorney, Agent, or Firm*—Haverstock & Owens LLP

(57) ABSTRACT

An apparatus and method for modulating an incident light beam for forming a two-dimensional projection image. The apparatus includes a plurality of elongated elements each having a reflective surface. The elongated elements are suspended substantially parallel to each other above a substrate with their respective ends supported, forming a column of adjacent reflecting surfaces grouped according to display elements. Alternate ones of each group are deformable by a applying a voltage with respect to the substrate. An approximately flat center section of each deformed element is substantially parallel to and a predetermined distance from a center section of each undeformed element. Limiting the predetermined distance avoids hysteresis in deforming the elements and avoids adhesion of the elements to the substrate. A light beam incident to the column of adjacent reflecting surfaces is reflected from a group of elongated elements when the alternate ones are undeformed and diffracted when alternate ones are deformed. A distance of movement is controlled or a ratio of between reflection and diffraction periods determines a display intensity for the corresponding display element. Diffracted light is collected by a lens and reflected by a scanning mirror into an eyepiece or onto a display screen. A light shield having a slit of predetermined width is positioned at the pupil such that light collected by the lens other than light diffracted from the center sections of the elongated elements is prevented from passing through the slit. The scanning mirror sweeps a two-dimensional color image into the eyepiece or onto the display screen.

61 Claims, 11 Drawing Sheets

U.S. PATENT DOCUMENTS

| | | | |
|---|---|---|---|
| 2,991,690 | 7/1961 | Grey et al. | 88/16.6 |
| 3,553,364 | 1/1971 | Lee | 178/7.3 |
| 3,576,394 | 4/1971 | Lee | 178/7.3 |
| 3,600,798 | 8/1971 | Lee | 29/592 |
| 3,656,837 | 4/1972 | Sandbank | 350/161 |
| 3,743,507 | 7/1973 | Ih et al. | 96/81 |
| 3,802,769 | 4/1974 | Rotz et al. | 352/43 |
| 3,886,310 | 5/1975 | Guldberg et al. | 178/7.5 D |
| 3,896,338 | 7/1975 | Nathanson et al. | 315/373 |
| 3,935,499 | 1/1976 | Oess | 313/413 |
| 3,935,500 | 1/1976 | Oess et al. | 313/495 |
| 3,947,105 | 3/1976 | Smith | 353/121 |
| 3,969,611 | 7/1976 | Fonteneau | 219/502 |
| 4,001,663 | 1/1977 | Bray | 321/2 |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,034,211 | 7/1977 | Horst et al. | 235/61.12 N |
| 4,067,129 | 1/1978 | Abramson et al. | 40/563 |
| 4,084,437 | 4/1978 | Finnegan | 73/361 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,127,322 | 11/1978 | Jacobson et al. | 353/31 |
| 4,135,502 | 1/1979 | Peck | 128/76.5 |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,185,891 | 1/1980 | Kaestner | 350/167 |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,256,787 | 3/1981 | Shaver et al. | 428/1 |
| 4,327,411 | 4/1982 | Tuner | 364/900 |
| 4,327,966 | 5/1982 | Bloom | 350/162 R |
| 4,338,660 | 7/1982 | Kelley et al. | 364/200 |
| 4,361,384 | 11/1982 | Bosserman | 350/174 |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 362/200 |
| 4,447,881 | 5/1984 | Brantingham et al. | 364/488 |
| 4,454,591 | 6/1984 | Lou | 364/900 |
| 4,468,725 | 8/1984 | Venturini | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,636,866 | 1/1987 | Hattori | 358/236 |
| 4,641,193 | 2/1987 | Glenn | 358/233 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/3.6 |
| 4,662,746 | 5/1987 | Hornbeck | 350/269 |
| 4,663,670 | 5/1987 | Ito et al. | 358/245 |
| 4,698,602 | 10/1987 | Armitage | 332/7.51 |
| 4,709,995 | 12/1987 | Kuribayashi et al. | 350/350 S |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,747,671 | 5/1988 | Takahashi et al. | 350/336 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,934,773 | 6/1990 | Becker | 350/6.6 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,003,300 | 3/1991 | Wells | 340/705 |
| 5,013,141 | 5/1991 | Sakata | 350/348 |
| 5,018,256 | 5/1991 | Hornbeck | 29/25.01 |
| 5,022,750 | 6/1991 | Flasck | 353/31 |
| 5,024,494 | 6/1991 | Williams et al. | 350/3.6 |
| 5,028,939 | 7/1991 | Hornbeck et al. | 346/160 |
| 5,035,473 | 7/1991 | Kuwayama et al. | 350/3.7 |
| 5,037,173 | 8/1991 | Sampsell et al. | 385/17 |
| 5,041,851 | 8/1991 | Nelson | 346/160 |
| 5,048,077 | 9/1991 | Wells et al. | 379/96 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/715.06 |
| 5,079,544 | 1/1992 | DeMond et al. | 340/701 |
| 5,083,857 | 1/1992 | Hornbeck | 359/291 |
| 5,089,903 | 2/1992 | Kuwayama et al. | 359/15 |
| 5,096,279 | 3/1992 | Hornbeck et al. | 359/230 |
| 5,099,353 | 3/1992 | Hornbeck | 359/291 |
| 5,101,184 | 3/1992 | Antes | 235/454 |
| 5,101,236 | 3/1992 | Nelson et al. | 355/229 |
| 5,105,207 | 4/1992 | Nelson | 346/160 |
| 5,105,299 | 4/1992 | Anderson et al. | 359/223 |
| 5,105,369 | 4/1992 | Nelson | 364/525 |
| 5,113,272 | 5/1992 | Reamey | 359/53 |
| 5,113,285 | 5/1992 | Franklin et al. | 359/465 |
| 5,119,204 | 6/1992 | Hashimoto et al. | 358/254 |
| 5,121,343 | 6/1992 | Faris | 395/111 |
| 5,128,660 | 7/1992 | DeMond et al. | 340/707 |
| 5,129,716 | 7/1992 | Holakovszky et al. | 351/50 |
| 5,132,812 | 7/1992 | Takahashi et al. | 359/9 |
| 5,142,303 | 8/1992 | Nelson | 346/108 |
| 5,142,405 | 8/1992 | Hornbeck | 359/226 |
| 5,142,677 | 8/1992 | Ehlig et al. | 395/650 |
| 5,148,157 | 9/1992 | Florence | 340/783 |
| 5,148,506 | 9/1992 | McDonald | 385/16 |
| 5,151,718 | 9/1992 | Nelson | 346/160 |

| Patent No. | Date | Inventor(s) | Class |
|---|---|---|---|
| 5,151,724 | 9/1992 | Kikinis | 357/17 |
| 5,155,604 | 10/1992 | Miekka et al. | 359/2 |
| 5,155,615 | 10/1992 | Tagawa | 359/213 |
| 5,155,778 | 10/1992 | Magel et al. | 385/18 |
| 5,155,812 | 10/1992 | Ehlig et al. | 395/275 |
| 5,159,485 | 10/1992 | Nelson | 359/291 |
| 5,161,042 | 11/1992 | Hamada | 359/41 |
| 5,162,787 | 11/1992 | Thompson et al. | 340/794 |
| 5,165,013 | 11/1992 | Faris | 395/104 |
| 5,168,406 | 12/1992 | Nelson | 359/855 |
| 5,170,156 | 12/1992 | DeMond et al. | 340/794 |
| 5,170,269 | 12/1992 | Lin et al. | 359/9 |
| 5,170,283 | 12/1992 | O'Brien et al. | 359/291 |
| 5,172,161 | 12/1992 | Nelson | 355/200 |
| 5,172,262 | 12/1992 | Hornbeck | 359/223 |
| 5,178,728 | 1/1993 | Boysel et al. | 156/656 |
| 5,179,274 | 1/1993 | Sampsell | 250/208.2 |
| 5,179,367 | 1/1993 | Shimizu | 340/700 |
| 5,181,231 | 1/1993 | Parikh et al. | 377/26 |
| 5,182,665 | 1/1993 | O'Callaghan et al. | 359/95 |
| 5,192,946 | 3/1993 | Thompson et al. | 340/794 |
| 5,202,785 | 4/1993 | Nelson | 359/214 |
| 5,206,629 | 4/1993 | DeMond et al. | 340/719 |
| 5,212,555 | 5/1993 | Stoltz | 358/206 |
| 5,212,582 | 5/1993 | Nelson | 359/224 |
| 5,214,419 | 5/1993 | DeMond et al. | 340/794 |
| 5,214,420 | 5/1993 | Thompson et al. | 340/795 |
| 5,216,537 | 6/1993 | Hornbeck | 359/291 |
| 5,221,982 | 6/1993 | Faris | 359/93 |
| 5,226,099 | 7/1993 | Mignardi et al. | 385/19 |
| 5,231,363 | 7/1993 | Sano et al. | 332/109 |
| 5,231,388 | 7/1993 | Stoltz | 340/783 |
| 5,231,432 | 7/1993 | Glenn | 353/31 |
| 5,233,456 | 8/1993 | Nelson | 359/214 |
| 5,237,340 | 8/1993 | Nelson | 346/108 |
| 5,237,435 | 8/1993 | Kurematsu et al. | 359/41 |
| 5,240,818 | 8/1993 | Mignardi et al. | 430/321 |
| 5,245,686 | 9/1993 | Faris et al. | 385/120 |
| 5,247,180 | 9/1993 | Mitcham et al. | 250/492.1 |
| 5,247,593 | 9/1993 | Lin et al. | 385/17 |
| 5,254,980 | 10/1993 | Hendrix et al. | 345/84 |
| 5,255,100 | 10/1993 | Urbanus | 358/231 |
| 5,256,869 | 10/1993 | Lin et al. | 250/201.9 |
| 5,262,000 | 11/1993 | Wellbourn et al. | 156/643 |
| 5,272,473 | 12/1993 | Thompson et al. | 345/7 |
| 5,278,652 | 1/1994 | Urbanus et al. | 358/160 |
| 5,278,925 | 1/1994 | Boysel et al. | 385/14 |
| 5,280,277 | 1/1994 | Hornbeck | 345/108 |
| 5,281,887 | 1/1994 | Engle | 310/335 |
| 5,281,957 | 1/1994 | Schoolman | 345/8 |
| 5,285,196 | 2/1994 | Gale, Jr. | 345/108 |
| 5,285,407 | 2/1994 | Gale et al. | 365/189.11 |
| 5,287,096 | 2/1994 | Thompson et al. | 345/147 |
| 5,287,215 | 2/1994 | Warde et al. | 359/293 |
| 5,289,172 | 2/1994 | Gale, Jr. et al. | 345/108 |
| 5,291,317 | 3/1994 | Newswanger | 359/15 |
| 5,291,473 | 3/1994 | Pauli | 369/112 |
| 5,293,511 | 3/1994 | Poradish et al. | 257/434 |
| 5,296,950 | 3/1994 | Lin et al. | 359/9 |
| 5,299,037 | 3/1994 | Sakata | 359/41 |
| 5,299,289 | 3/1994 | Omae et al. | 359/95 |
| 5,301,062 | 4/1994 | Takahashi et al. | 359/567 |
| 5,303,055 | 4/1994 | Hendrix et al. | 348/761 |
| 5,307,056 | 4/1994 | Urbanus | 340/189 |
| 5,307,185 | 4/1994 | Jones et al. | 359/41 |
| 5,311,349 | 5/1994 | Anderson et al. | 359/223 |
| 5,311,360 | 5/1994 | Bloom et al. | 359/572 |
| 5,312,513 | 5/1994 | Florence et al. | 156/643 |
| 5,313,479 | 5/1994 | Florence | 372/26 |
| 5,313,648 | 5/1994 | Ehlig et al. | 395/800 |
| 5,315,418 | 5/1994 | Sprague et al. | 359/41 |
| 5,319,214 | 6/1994 | Gregory et al. | 250/504 R |
| 5,319,789 | 6/1994 | Ehlig et al. | 395/800 |
| 5,319,792 | 6/1994 | Ehlig et al. | 395/800 |
| 5,321,416 | 6/1994 | Bassett et al. | 345/8 |
| 5,323,002 | 6/1994 | Sampsell et al. | 250/252.1 |
| 5,325,116 | 6/1994 | Sampsell | 346/108 |
| 5,327,286 | 7/1994 | Sampsell et al. | 359/561 |
| 5,330,878 | 7/1994 | Nelson | 430/311 |
| 5,331,454 | 7/1994 | Hornbeck | 359/224 |
| 5,339,116 | 8/1994 | Urbanus et al. | 348/716 |
| 5,345,521 | 9/1994 | McDonald et al. | 385/19 |
| 5,347,321 | 9/1994 | Gove | 348/663 |
| 5,347,378 | 9/1994 | Handschy et al. | 359/53 |
| 5,347,433 | 9/1994 | Sedlmayr | 362/32 |
| 5,348,619 | 9/1994 | Bohannon et al. | 156/664 |
| 5,349,687 | 9/1994 | Ehlig et al. | 395/800 |
| 5,351,052 | 9/1994 | D'Hont et al. | 342/42 |
| 5,357,369 | 10/1994 | Pilling et al. | 359/462 |
| 5,359,349 | 10/1994 | Jambor et al. | 345/168 |
| 5,363,220 | 11/1994 | Kuwayama et al. | 359/3 |
| 5,365,283 | 11/1994 | Doherty et al. | 348/743 |
| 5,367,585 | 11/1994 | Ghezzo et al. | 385/23 |
| 5,371,543 | 12/1994 | Anderson | 348/270 |
| 5,371,618 | 12/1994 | Tai et al. | 359/53 |
| 5,382,961 | 1/1995 | Gale, Jr. | 345/108 |
| 5,387,924 | 2/1995 | Gale, Jr. et al. | 345/108 |
| 5,389,182 | 2/1995 | Mignardi | 156/344 |
| 5,392,140 | 2/1995 | Ezra et al. | 359/41 |
| 5,392,151 | 2/1995 | Nelson | 359/223 |
| 5,398,071 | 3/1995 | Gove et al. | 348/558 |
| 5,410,315 | 4/1995 | Huber | 342/42 |
| 5,411,769 | 5/1995 | Hornbeck | 427/534 |
| 5,412,186 | 5/1995 | Gale | 219/679 |
| 5,418,584 | 5/1995 | Larson | 353/122 |
| 5,420,655 | 5/1995 | Shimizu | 353/33 |
| 5,430,524 | 7/1995 | Nelson | 355/200 |
| 5,435,876 | 7/1995 | Alfaro et al. | 156/247 |
| 5,442,411 | 8/1995 | Urbanus et al. | 348/771 |
| 5,442,414 | 8/1995 | Janssen et al. | 353/98 |
| 5,444,566 | 8/1995 | Gale et al. | 359/291 |
| 5,445,559 | 8/1995 | Gale et al. | 451/388 |
| 5,446,479 | 8/1995 | Thompson et al. | 345/139 |
| 5,447,600 | 9/1995 | Webb | 216/2 |
| 5,448,314 | 9/1995 | Heimbuch et al. | 348/743 |
| 5,448,546 | 9/1995 | Pauli | 369/112 |
| 5,450,088 | 9/1995 | Meier et al. | 342/51 |
| 5,450,219 | 9/1995 | Gold et al. | 359/40 |
| 5,451,103 | 9/1995 | Hatanaka et al. | 353/31 |
| 5,452,024 | 9/1995 | Sampsell | 348/755 |
| 5,452,138 | 9/1995 | Mignardi et al. | 359/855 |
| 5,453,747 | 9/1995 | D'Hont et al. | 342/42 |
| 5,453,778 | 9/1995 | Venkateswar et al. | 347/239 |
| 5,453,803 | 9/1995 | Shapiro et al. | 353/119 |
| 5,454,906 | 10/1995 | Baker et al. | 216/66 |
| 5,455,602 | 10/1995 | Tew | 347/239 |
| 5,457,493 | 10/1995 | Leddy et al. | 348/164 |
| 5,457,566 | 10/1995 | Sampsell et al. | 359/292 |
| 5,458,716 | 10/1995 | Alfaro et al. | 156/245 |
| 5,459,492 | 10/1995 | Venkateswar | 347/253 |
| 5,459,528 | 10/1995 | Pettitt | 348/568 |
| 5,459,592 | 10/1995 | Shibatani et al. | 359/40 |
| 5,459,610 | 10/1995 | Bloom et al. | 359/572 |
| 5,461,410 | 10/1995 | Venkateswar et al. | 347/240 |
| 5,461,411 | 10/1995 | Florence et al. | 347/240 |
| 5,461,547 | 10/1995 | Ciupke et al. | 362/31 |
| 5,463,347 | 10/1995 | Jones et al. | 330/253 |
| 5,465,175 | 11/1995 | Woodgate et al. | 359/463 |
| 5,467,106 | 11/1995 | Salomon | 345/87 |
| 5,467,138 | 11/1995 | Gove | 348/452 |
| 5,467,146 | 11/1995 | Huang et al. | 348/743 |
| 5,469,302 | 11/1995 | Lim | 359/846 |

| | | | |
|---|---|---|---|
| 5,481,118 | 1/1996 | Tew | 250/551 |
| 5,482,564 | 1/1996 | Douglas et al. | 134/18 |
| 5,482,818 | 1/1996 | Nelson | 430/394 |
| 5,483,307 | 1/1996 | Anderson | 353/98 |
| 5,485,172 | 1/1996 | Sawachika et al. | 345/8 |
| 5,485,304 | 1/1996 | Kaeriyama | 359/291 |
| 5,485,354 | 1/1996 | Ciupke et al. | 362/31 |
| 5,486,698 | 1/1996 | Hanson et al. | 250/332 |
| 5,486,841 | 1/1996 | Hara et al. | 345/8 |
| 5,486,946 | 1/1996 | Jachimowicz et al. | 359/263 |
| 5,488,431 | 1/1996 | Gove et al. | 348/716 |
| 5,489,952 | 2/1996 | Gove et al. | 348/771 |
| 5,490,009 | 2/1996 | Venkateswar et al. | 359/291 |
| 5,491,510 | 2/1996 | Gove | 348/77 |
| 5,491,715 | 2/1996 | Flaxl | 375/344 |
| 5,493,439 | 2/1996 | Engle | 359/292 |
| 5,497,172 | 3/1996 | Doherty et al. | 345/85 |
| 5,497,197 | 3/1996 | Gove et al. | 348/388 |
| 5,497,262 | 3/1996 | Kaeriyama | 359/223 |
| 5,499,060 | 3/1996 | Gove et al. | 348/651 |
| 5,499,062 | 3/1996 | Urbanus | 348/771 |
| 5,500,761 | 3/1996 | Goossen et al. | 359/290 |
| 5,502,481 | 3/1996 | Dentinger et al. | 348/51 |
| 5,504,504 | 4/1996 | Markandey et al. | 345/214 |
| 5,504,514 | 4/1996 | Nelson | 347/130 |
| 5,504,575 | 4/1996 | Stafford | 356/330 |
| 5,504,614 | 4/1996 | Webb et al. | 359/223 |
| 5,506,171 | 4/1996 | Leonard et al. | 437/187 |
| 5,506,597 | 4/1996 | Thompson et al. | 345/85 |
| 5,506,720 | 4/1996 | Yoon | 359/224 |
| 5,508,750 | 4/1996 | Hewlett et al. | 348/558 |
| 5,508,840 | 4/1996 | Vogel et al. | 359/292 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,517,359 | 5/1996 | Gelbart | 359/623 |
| 5,519,450 | 5/1996 | Urbanus et al. | 348/600 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |
| 5,539,422 | 7/1996 | Heacock et al. | 345/8 |
| 5,623,361 | 4/1997 | Engle | 359/291 |
| 5,704,700 | 1/1998 | Kappel et al. | 353/31 |
| 5,742,373 | 4/1998 | Alvelda | 349/204 |
| 5,757,536 * | 5/1998 | Ricco et al. | 359/224 |
| 5,768,009 | 6/1998 | Little | 359/293 |
| 5,808,797 * | 9/1998 | Bloom et al. | 359/572 |
| 5,926,309 | 7/1999 | Little | 359/293 |
| 5,949,570 | 9/1999 | Shiono et al. | 359/291 |
| 5,999,319 * | 12/1999 | Castracane | 359/573 |

FOREIGN PATENT DOCUMENTS

| | | | |
|---|---|---|---|
| 0 477 566 A2 | 4/1992 | (EP). | |
| 0 488 326 A3 | 6/1992 | (EP). | |
| 0 530 760 A2 | 3/1993 | (EP). | |
| 0 610 665 A1 | 8/1994 | (EP). | |
| 0 627 644 A2 | 12/1994 | (EP) | G02B/27/00 |
| 0 627 850 A1 | 12/1994 | (EP) | H04N/5/64 |
| 0 643 314 A2 | 3/1995 | (EP) | G02B/27/00 |
| 0 654 777 A1 | 5/1995 | (EP) | G09G/3/34 |
| 0 658 868 A1 | 6/1995 | (EP) | G09G/3/34 |
| 2 118 365 | 10/1983 | (GB) | H01L/27/13 |
| 2 266 385 | 10/1993 | (GB) | G02B/23/10 |
| 63-305323 | 12/1988 | (JP) | G02F/1/13 |
| 2-219092 | 8/1990 | (JP) | G09G/3/28 |
| WO 92/12506 | 7/1992 | (WO) | G09F/9/37 |
| WO 93/02269 | 2/1993 | (WO) | E06B/5/10 |
| WO 93/09472 | 5/1993 | (WO) | G03F/7/20 |
| WO 93/18428 | 9/1993 | (WO) | G02B/27/00 |
| WO 95/11473 | 4/1995 | (WO) | G02B/27/00 |
| WO 96/08031 | 3/1996 | (WO). | |

OTHER PUBLICATIONS

Hornbeck. L.J., "Deformable–Mirror Spatial Light Modulators," Spatial Light Modulators and Applications III, Aug. 8, 1989, pp. 86–102.

R. N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

Russick et al., "Supercritical Carbon Dioxide Extraction of Solvent from Micromachined Structures," Supercritical Fluids, Chapter 18, pp. 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp. 552–557, Mar. 1999.

R. Apte, F. Sandejas, W. Banyai, D. Bloom, "Grating Light Valves For High Resolution Displays", Ginzton Laboratories, Stanford University, Stanford, CA 94305–4085, Jun. 1994.

R. Apte, "Grating Light Valves For High Resolution Displays," Jun. 1994.

O. Solgaard, "Integrated Semiconductor Light Modulators For Fiber–Optic And Display Applications," Feb. 1992.

J. Neff, "Two–Dimensional Spatial Light Modulators: A Tutorial", Proceedings of the IEEE, vol. 78, No. 5, pp. 826–855, May, 1990.

Gerhard–Multhaupt, "Visoelastic Spatial Light Modulators and Schlieren–Optical Systems for HDTV Projection Displays", SPIE vol. 1255 Large Screen Projection Displays II, pp. 69–78, 1990.

Gerhard–Multhaupt, "Light–Valve Technologies for High–Definition Television Projection Displays", Displays, vol. 12, No. 3/4, pp. 115–128, 1991.

Alvelda et al., "Ferroelectric Microdisplays Using Distortion–Compensated Pixel Layouts," SID 95 Digest, pp. 931–933, 1995.

Phillip Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, 1993.

Farn et al., "Color Separation by use of Binary Optics," Optics Letters, vol. 18:15, pp. 1214–1216, 1993.

Phillip Alvelda, "VLSI Microdisplays and Optoelectric Technology," MIT, pp. 1–93, 1995.

Phillip Alvelda, "VLSI Microdisplay technology," Oct. 14, 1994.

F. Sandejas, R. Apte, W. Banyai, D. Bloom, "Surface Microfabrication of Deformable Grating Light Valves For High Resolution Displays," The 7th International Conference on Solid–State Sensors and Actuators, pp. 6 & 7, (no date).

O.Solgaard, F. Sandejas, and D. Bloom, "Deformable Grating Optical Modulator," Optics letters, vol. 17, No. 9, New York, USA, pp. 688–690, May 1, 1992.

* cited by examiner

METHOD AND APPARATUS FOR MODULATING AN INCIDENT LIGHT BEAM FOR FORMING A TWO-DIMENSIONAL IMAGE

FIELD OF THE INVENTION

The invention relates to a method and apparatus for modulating a light beam for forming a two-dimensional image. More particularly, the invention relates to a columnar diffraction grating for performing such modulation.

BACKGROUND OF THE INVENTION

Many applications exist for devices which modulate a light beam, e.g. by altering the amplitude, frequency or phase of the light. An example of such a device is a reflective deformable grating light modulator 10, as illustrated in FIG. 1. This modulator 10 was proposed by Bloom et al., in U.S. Pat. No. 5,311,360. The modulator 10 includes a plurality of equally spaced apart, deformable reflective ribbons 18 which are suspended above a substrate 16 having reflective surface portions. An insulating layer 11 is deposited on the silicon substrate 16. This is followed by the deposition of a sacrificial silicon dioxide film 12 and a low-stress silicon nitride film 14. The nitride film 14 is patterned to form the ribbons and portions of the silicon dioxide layer 12 are etched such that the ribbons 18 are held by a nitride frame 20 on an oxide spacer layer 12. For modulating light having a single wavelength $\lambda_0$, the modulator is designed such that the thickness of the ribbons 18 and the thickness of the oxide spacer 12 both equal $\lambda_0/4$.

The grating amplitude of this modulator 10, defined as the perpendicular distance, d, between the reflective surfaces 22 on the ribbons 18 and the reflective surfaces of the substrate 16, is controlled by applying voltage between the ribbons 18 (the reflective surface 22 of the ribbons 16 serves as a first electrode) and the substrate 16 (a conductive film 24 beneath the substrate 16 serves as a second electrode). In its undeformed state, with no voltage applied, the grating amplitude equals $\lambda_0/2$ and the total path length difference between light reflected from the ribbons and the substrate equals $\lambda_0$, resulting in these reflections adding in phase. Thus, in the undeformed state, the modulator 10 reflects light as a flat mirror. The undeformed state is illustrated in FIG. 2 with incident and reflected light indicated as 26.

When an appropriate voltage is applied between the ribbons 18 and the substrate 16, an electrostatic force deforms the ribbons 18 into a down position in contact with the surface of the substrate 16. In the down position, the grating amplitude is changed to equal $\lambda_0/4$. The total path length difference is one-half the wavelength, resulting in the reflections from the surface of the deformed ribbons 18 and the reflections from the substrate 16 interfering destructively. As a result of this interference the modulator diffracts the incident light 26. The deformed state is illustrated in FIG. 3 with the diffracted light in the +/−1 diffraction modes ($D_{+1}$, $D_{-1}$) indicated as 28 and 30, respectively.

Adhesion between the ribbons 18 and the substrate 16 during wet processing utilized to create the space below the ribbons 18 and during operation of the modulator 10 has been found to be a problem in these devices. Numerous techniques to reduce adhesion have been proposed, including: freeze-drying, dry etching of a photoresist-acetone sacrificial layer, OTS monolayer treatments, use of stiffer ribbons by using shorter ribbons and/or tenser nitride films, roughening or corrugating one or both of the surfaces, forming inverted rails on the underneath of the ribbons, and changing the chemical nature of the surfaces. Sandejas et al. in "Surface Microfabrication of Deformable Grating Light Valves for High Resolution Displays" and Apte et al. in "Grating Light Valves for High Resolution Displays", Solid State Sensors and Actuators Workshop, Hilton Head Island, S.C. (June 1994), have demonstrated that such adhesion may be prevented by reducing the area of contact by forming inverted rails on the underneath of the bridges and by using rough polysilicon films, respectively.

Furthermore, as Apte et al. recognize, a feature of the mechanical operation of the modulator 10 is hysteresis in the deformation of the ribbons 18 as a function of applied voltage. The theorized reason for the hysteresis is that the electrostatic attractive force between the ribbons 18 and the substrate 16 is a non-linear function of the amount of deformation, while the restoring force caused by stiffness and tension of the ribbons 18 is a substantially linear function. FIG. 4 illustrates a simulated hysteresis characteristic where the light output (an indirect indicator of the amount of deformation of the ribbons 18) is shown on the vertical axis and the voltage between the ribbons 18 and the substrate 16 is shown on the horizontal axis. Thus, when the ribbons 18 are deformed into the down position in contact with the substrate 16, they latch in place, requiring a smaller holding voltage than the original applied voltage.

Bloom et al., in U.S. Pat. No. 5,311,360 teach that this latching feature is desirable as it gives the modulator 10 the advantages of active matrix design without the need for active components. In addition, Bloom et al. teach that this latching feature is also desirable in low power applications where efficient use of available power is very important. Recognizing the adhesion problem, however, Bloom et al., teach adding small ridges below the ribbons 18 to reduce the contact area and thereby reduce the adhesion problem. Because the substrate of the modulator 10 is used as an optical surface, however, the manufacturing processes for adding small ridges to the surface is complicated by the requirements that the reflecting portions of the substrate 16 be smooth with high reflectivity and be in a plane parallel to the ribbons 18.

Conventional displays are formed in two dimensional arrays of pixels. The discrete image formed by each of the myriad of pixels are integrated by the eye of the user to form a composite of the pixels representing an overall image. Unfortunately, the cost of such a display system increases because as each pixel is replicated to form the entire array the cost of making each pixel is similarly replicated. Examples of such pixellated displays are televisions and computer monitors. The pixels for each can be formed of LCD devices, or by a CRT.

Therefore, what is needed is a diffraction grating light valve in which adhesion between reflective elements and a substrate is reduced or eliminated without resorting to complicated surface treatments required for reducing such adhesion.

What is also needed is a display that lowers the cost of manufacture by reducing the number of pixels required to build the system without lowering the image quality.

SUMMARY OF THE INVENTION

The invention is a diffraction grating light valve (GLV) and method of use thereof for modulating an incident light beam for forming a two-dimensional image. The diffraction grating light valve includes a plurality of elongated elements each of which have a reflective surface. The elongated elements are suspended substantially parallel to each other above a substrate with their respective ends supported and substantially aligned so as to form a column of adjacent reflecting surfaces (GLV array). The elongated elements are grouped according to display elements. Alternate ones of each group are deformable by a applying a voltage with respect to the substrate. An approximately flat center portion of each deformed elongated element is substantially parallel to and a predetermined distance from a center portion of each undeformed element. The predetermined distance is selected to be approximately one-third to one-fourth of the distance between the undeformed reflective surfaces and the substrate such that deformed elongated elements do not contact the surface of the substrate. Avoiding contact with the substrate prevents the elongated elements from adhering to the substrate. In addition, limiting the predetermined distance avoids hysteresis in deforming the elongated elements.

A light beam incident to the column of adjacent reflecting surfaces is reflected from a group of elongated elements when the alternate ones of the group are undeformed. The light beam is diffracted by a group of elongated elements when alternate ones of the group are deformed. A ratio of between reflection and diffraction for a group during a time period determines a display intensity for the corresponding display element. The light beam is alternately red, green and blue during successive periods. In an alternate embodiment, the light beam is white light and widths of the elongated elements for each display element are selected to diffract red, green or blue wavelengths at an appropriate diffraction angle. An appropriate intensity and color for each display element is formed during respective periods according to the image to be represented by the respective display element.

Light diffracted from the column of reflecting surfaces is collected by a lens. At the exit pupil of the lens, the light is columnar and representative of a column of the image to be displayed. A light shield having a slit of predetermined width over the length of the column is positioned at the pupil of the second lens such that only a selected portion of the light passes through the slit. This arrangement of the shield prevents light collected by the first lens other than light diffracted from the approximately flat center portions of the elongated elements from passing through the slit. In an alternate embodiment, a fixed reflecting surface is placed over the ends of the elongated elements to prevent light from being diffracted other than from the approximately flat center portion of each elongated element. A pivotable reflective surface (scanning mirror) is positioned opposite the light shield from the lens to reflect the light passing through the slit into an eyepiece or onto a display screen. The reflective surface pivots back and forth, in synchronism with the column of display elements modulating the light, to represent columns of the display image. Accordingly, a two-dimensional color image is swept into the eyepiece or onto the display screen. The pivotable scanning mirror can be replace with other types of mirror arrangements such as a rotating faceted polygon mirror.

DETAILED DESCRIPTION OF A PREFERRED EMBODIMENT

Figure 5:
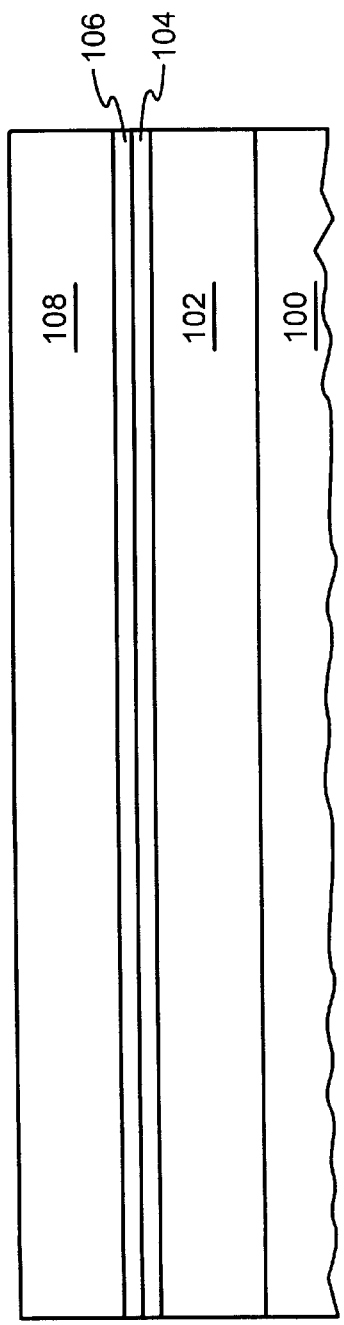
FIGS. 5–6 and 8 illustrate side sectional views of a process sequence for manufacturing a columnar diffraction grating light valve (GLV) according to the present invention.
Figure 6:
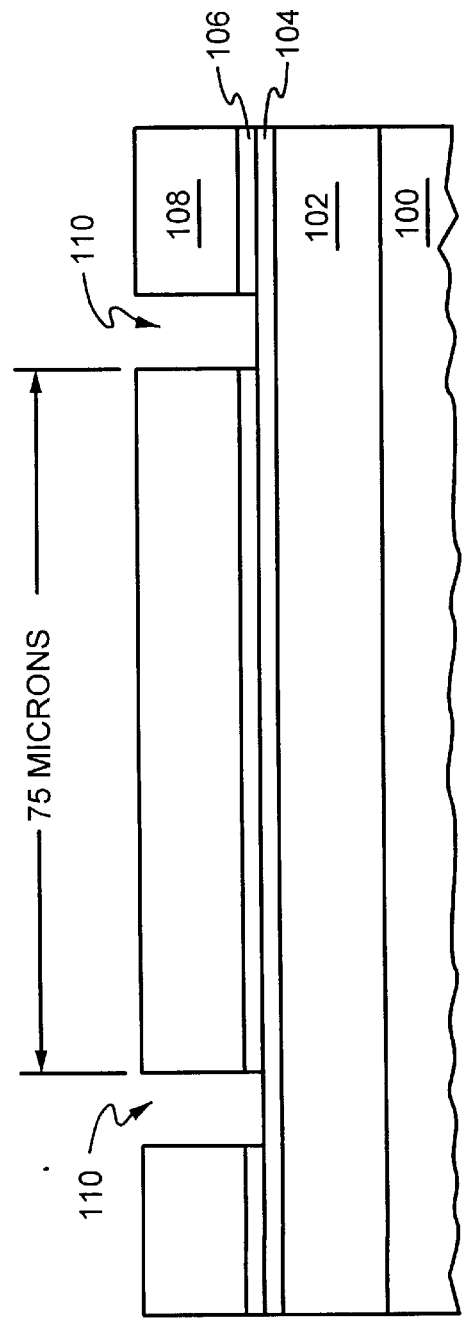
Figure 8:
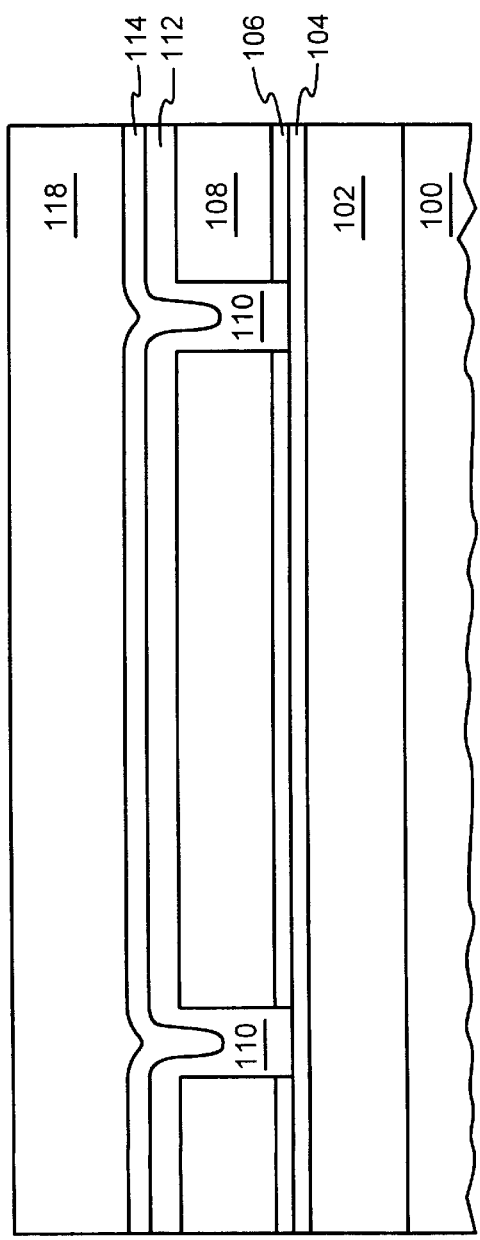

FIGS. 5–6 and 8 illustrate side sectional views of a process sequence for manufacturing a columnar diffraction grating light valve (GLV) according to the present invention. Referring to FIG. 5, an insulating layer is formed on a silicon substrate 100. Preferably, the insulating layer is a composite layer including a field oxide layer 102 formed by thermal oxidation and a thin layer of silicon nitride 102 formed over the field oxide layer 104. Then, a conducting layer 106 is formed over the nitride layer 104. Preferably, the conducting layer 106 is a refractory metal, such as tungsten, molybednum, titanium-tungsten or tantalum or alternatively conductive Poly-silicon or a diffused conductor. The conducting layer 106 serves as a lower electrode for applying bias to selected ones of elongated elements of the GLV. In an alternate embodiment, the conducting layer 106 is formed on a lower surface of the substrate 100.

Next, a sacrificial layer 108 is formed over the conducting layer 106. The sacrificial layer 108 must be able to be selectively etched with respect to the conducting layer 106. Preferably, the sacrificial layer 108 is a layer of Poly-silicon which is etched with a dry etch of xenon diflouride. Alternatively, the sacrificial layer can be a layer of doped glass, such as boro-phospho-silicate glass or phoso-silicate glass. The thickness at which the sacrificial layer 108 is applied determines a distance between the conducting layer 106 and elongated elements to be formed over the sacrificial layer 108. As will be explained herein, the thickness of the sacrificial layer 108 departs significantly from prior light modulators in that the sacrificial layer 108 is substantially thicker. In the preferred embodiment, the thickness of the sacrificial layer 108 is approximately equal to the expected wavelength of incident light. For example, if the expected wavelength is in the visible range (approximately 450–760 nm), the thickness of the sacrificial layer 108 is also within this approximate range. If the expected wavelength is in the ultraviolet range (approximately 200–450 nm) the thickness of the sacrificial layer 108 is also within this approximate range. If the expected wavelength is in the infrared range (approximately 760–2000 nm) the thickness of the sacrificial layer 108 is also within this approximate range.

Referring to FIG. 6, the conducting layer 106 and the sacrificial layer 108 are photo-lithographically masked by known techniques and then etched sequentially by appropriate dry or wet etch chemistries, forming a pair of post holes 110 for each elongated element of the GLV. Preferably, the post holes 110 are formed at distance of approximately 75 microns from each other, though another distance can be utilized. For illustration purposes, the apparent thicknesses of the layers 102–108 are exaggerated relative to the distance between the post holes 110.

Figure 7:
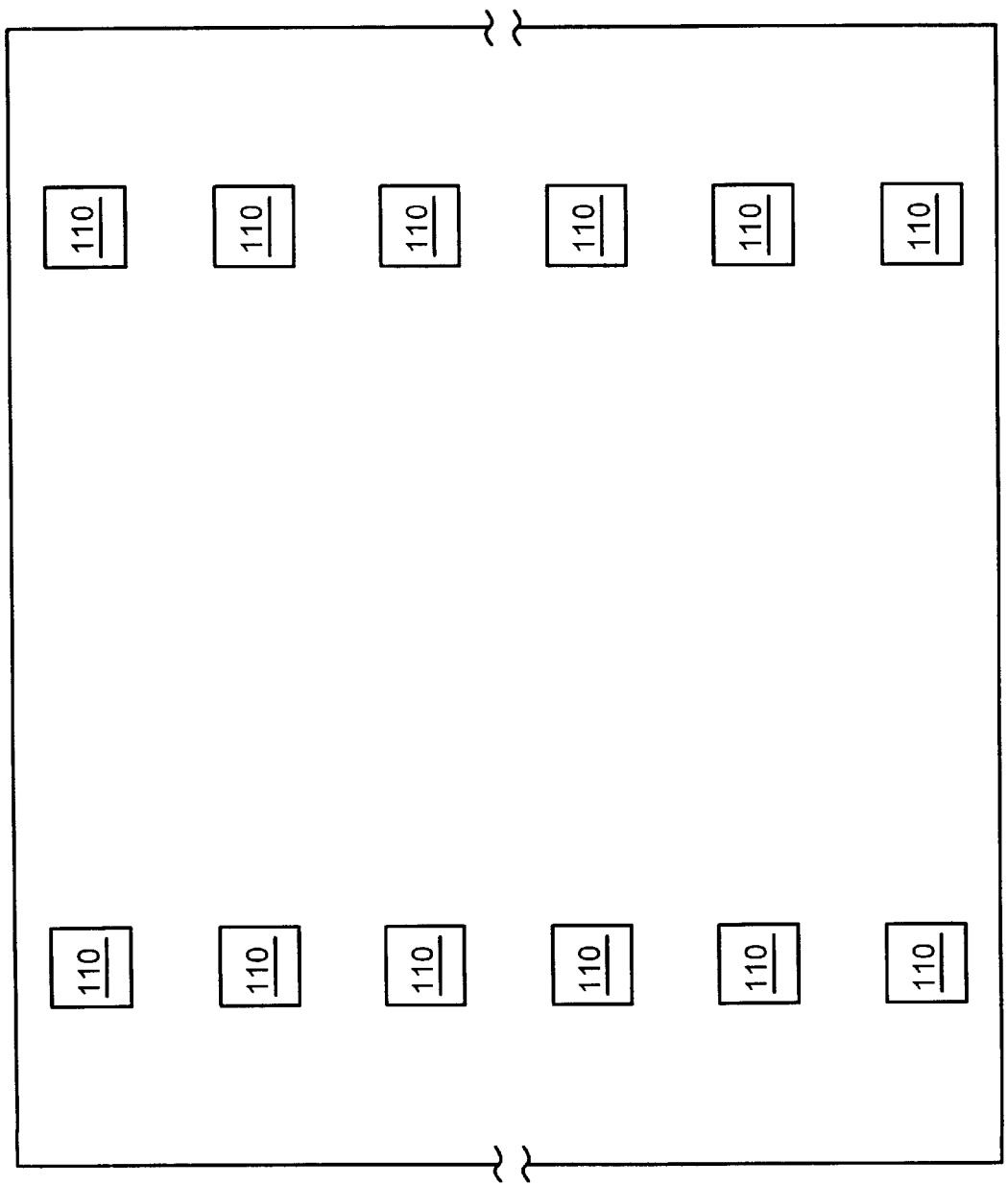
FIG. 7 illustrates a top view of a step of the process sequence for manufacturing a columnar diffraction grating light valve according to the present invention.

FIG. 7 illustrates a top view of the GLV after the post holes 110 have been etched as described above. For illustration purposes, FIG. 7 illustrates a column of six pairs of post holes 110, each pair corresponding to an elongated element of the GLV. In the preferred embodiment, the GLV includes more pairs of post holes 110. For example, 1920 pairs of post holes 110 can be utilized corresponding to 1920 elongated elements arranged in a columnar array.

Referring to FIG. 8, a layer of resilient material 112 is formed over the sacrificial layer 108 and post holes 110, partially or completely filling the post holes 110. Preferably, the resilient material 112 is layer of silicon nitride deposited to a thickness and residual stress defined by a spring force necessary to return each elongated element to an up state after a sufficient opposite polarity bias is applied to cancel electrostatic force induced by a bias applied to place the elongated element in a down state. Next, a reflective layer 114 is deposited over the resilient layer 112. The reflective layer 114 provides a reflective surface for each elongated element of the GLV and serves as an upper electrode for applying bias to selected ones of the elongated elements of the GLV. Preferably, the reflective layer 114 is sputtered aluminum.

Finally, a photoresist layer 118 is applied as a mask for selectively patterning the reflective layer 114 and the resilient layer 112 for forming the elongated elements. In addition, the sacrificial layer 108 is etched, leaving an air space beneath the elongated elements.

Figure 9:
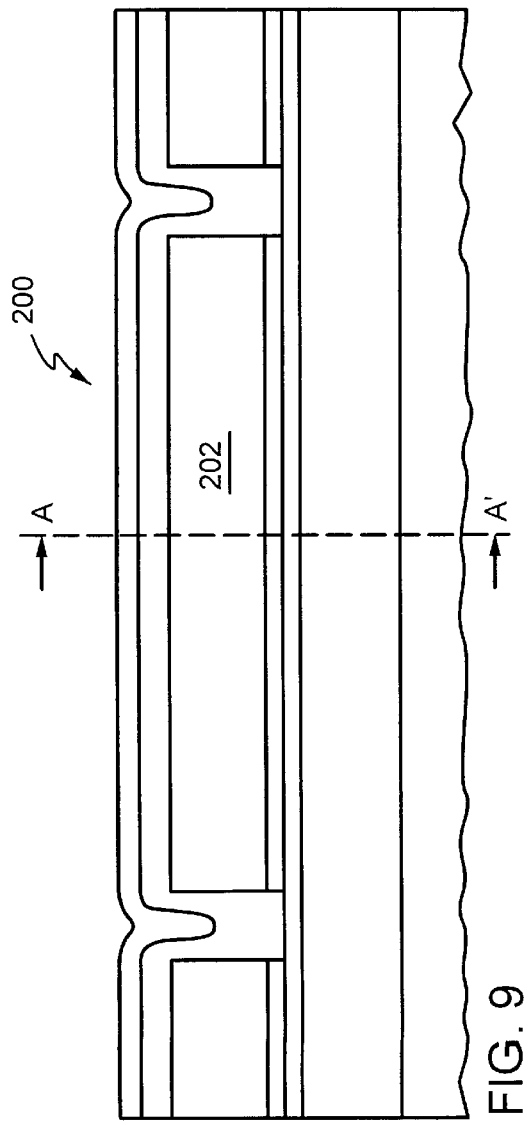
FIG. 9 illustrates a side sectional view of the columnar diffraction grating light valve according to the present invention.

FIG. 9 illustrates a side sectional view of an elongated element 200 of the GLV in an undeformed state. Note that in FIG. 9, the sacrificial layer 108 (FIGS. 5–6 and 8) beneath the elongated element 200 is replaced by an air space 202. Thus, the elongated element 200 is suspended by its ends above the surface of the substrate (including its constituent layers). In addition, the photoresist layer 118 (FIG. 8) has been removed.

Figure 10:
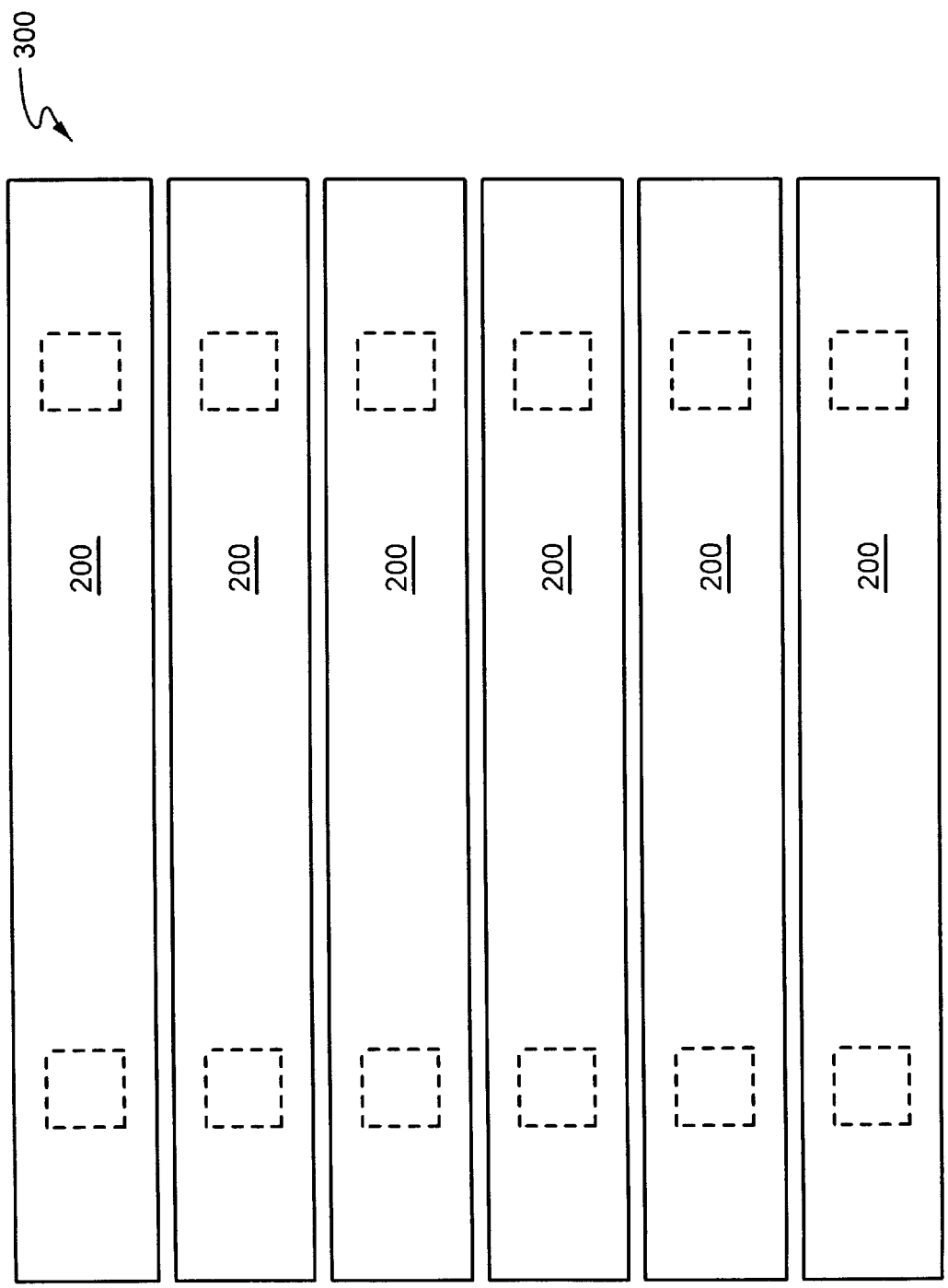
FIG. 10 illustrates a top view of a portion of the GLV including six elongated elements corresponding to a single display element.

FIG. 10 illustrates a top view of a portion of the GLV including six elongated elements 200. Note that the elongated elements 200 have equal widths and are arranged parallel to each other. The elongated elements 200 are also separated from each other by a small space, thus, allowing each elongated element 200 to be selectively deformed with respect to the others. The six elongated elements 200 illustrated in FIG. 10 preferably correspond to a single display element 300. Thus, the column of 1920 elongated elements corresponds to a GLV array having 320 display elements arranged in a column. It will be apparent that the number of display elements will affect a resulting display resolution and that a different number can be selected. In addition, each display element 300 can have a different number of elongated elements 200. For example, a group of two, four, eight, ten or twelve elongated elements 200 can correspond to a single display element 300. It is possible that even more elongated elements could be used to form a single display element 300. It is also possible that an odd number of elongated elements 200 could be used for a single display element 300.

Figure 11:
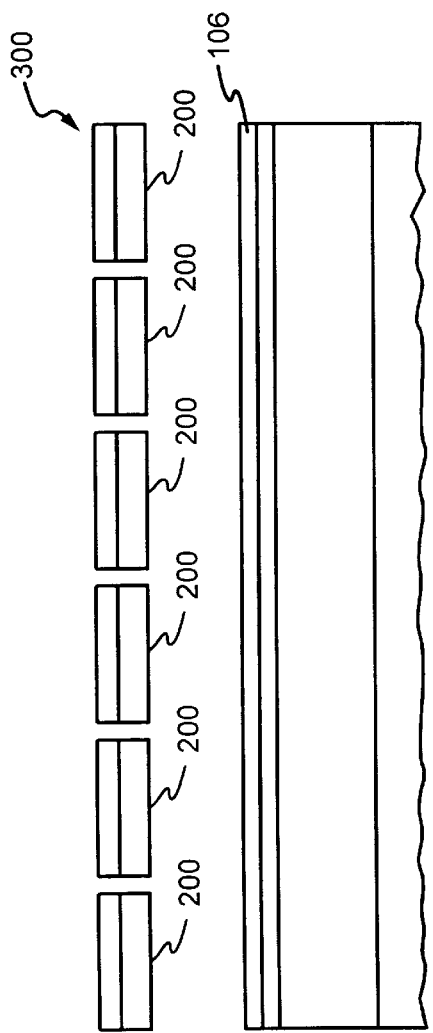
FIG. 11 illustrates a front sectional view of a display element of the GLV with the six elongated elements undeformed, reflecting incident light.

FIG. 11 illustrates a front sectional view of the display element 300 with the elongated elements 200 undeformed. The section illustrated in FIG. 11 is taken along the line A—A' illustrated in FIG. 9. The undeformed state is achieved by equalizing a bias on each elongated element 200 with respect to the conductive layer 106. Note that because the reflective surfaces of the elongated elements 200 are substantially co-planar, light incident to the elongated elements 200 is reflected.

Figure 1:
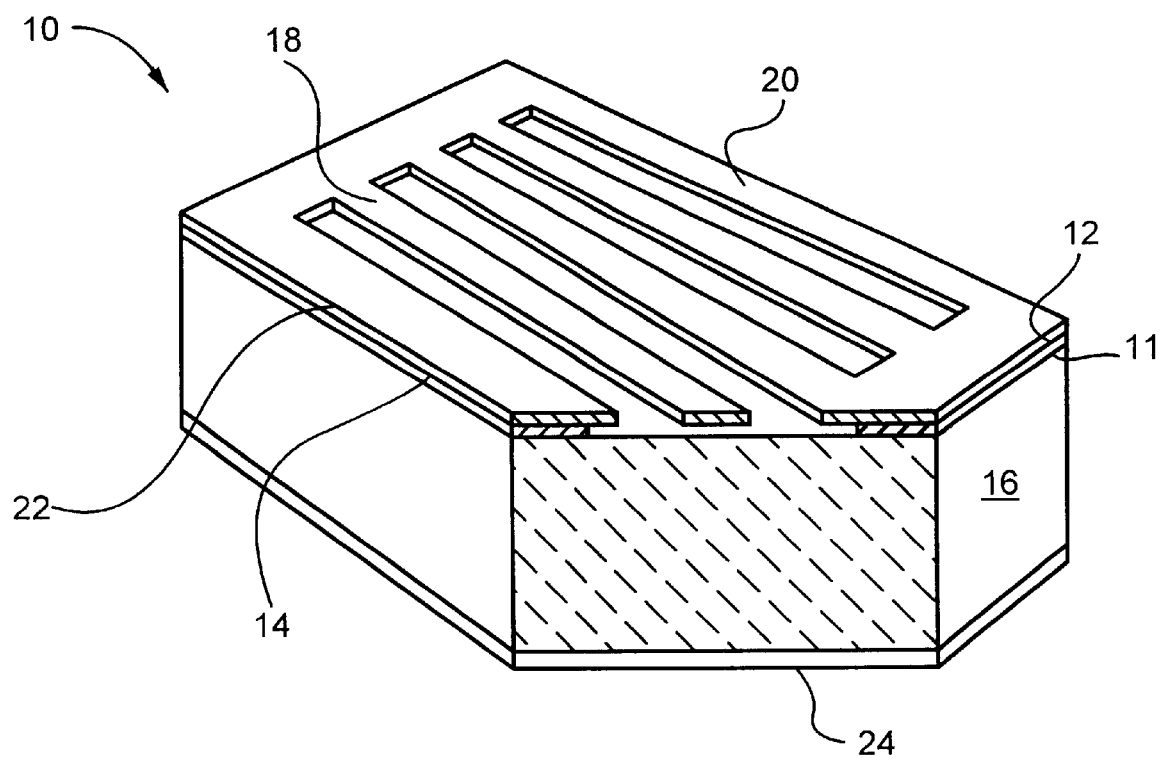
FIG. 1 illustrates a prior art reflective deformable grating light modulator.
Figure 2:
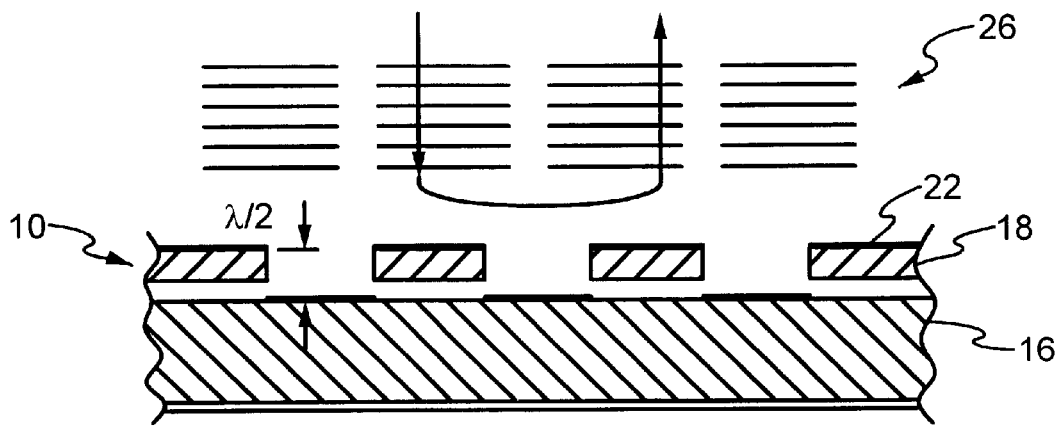
FIG. 2 illustrates the prior art reflective deformable grating light modulator in an undeformed state, reflecting incident light.
Figure 3:
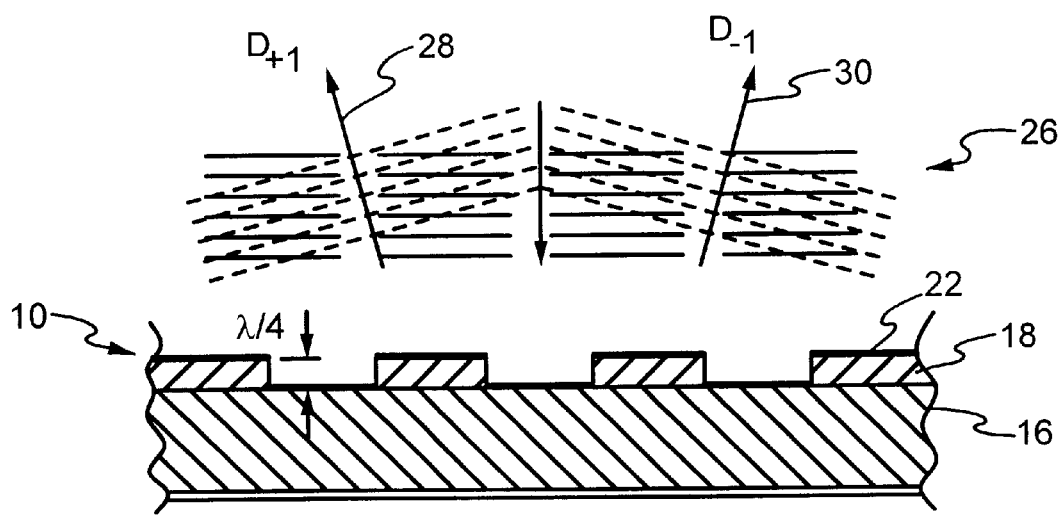
FIG. 3 illustrates the prior art reflective deformable grating light modulator in a deformed state, diffracting incident light.
Figure 12:
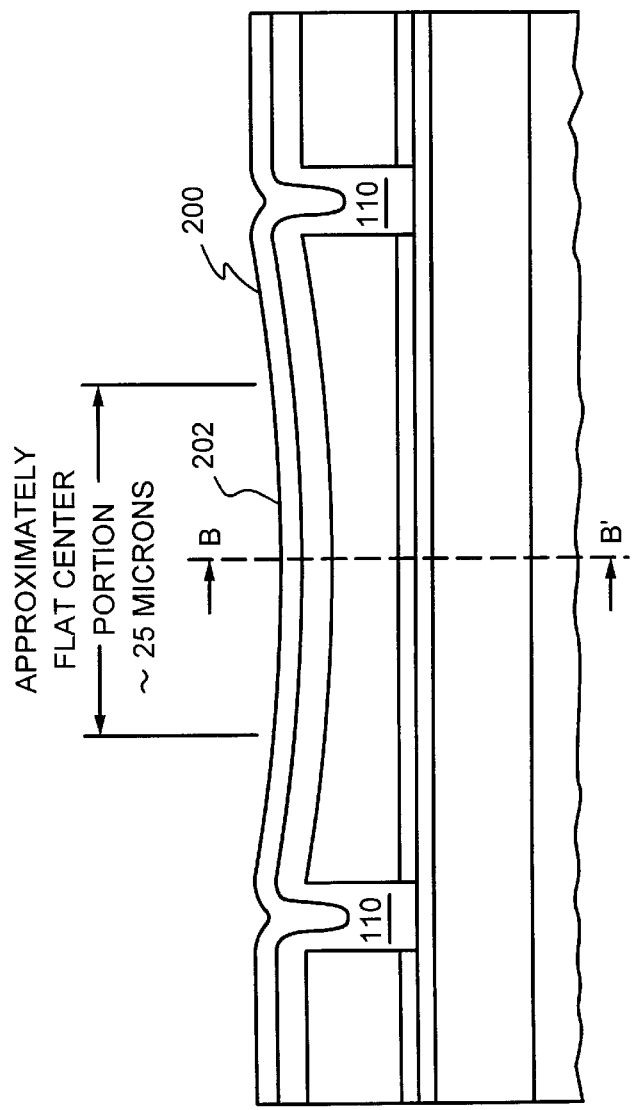
FIG. 12 illustrates a side sectional view of a deformed elongated element of the GLV according to the present invention.

FIG. 12 illustrates a side sectional view of a deformed elongated element 200 of the GLV. FIG. 12 illustrates that in the deformed state, the elongated element 200 remains suspended in that it does not come into contact with the surface of the substrate layers beneath the elongated element 200. This is in contrast to the prior modulator of FIGS. 1–3. By avoiding contact between the elongated element 200 and surface of the substrate, the problem of adhesion associated with the prior modulator is avoided. Note, however, that in the deformed state, the elongated element 200 tends to sag. This is because the electrostatic force pulling the elongated element 200 toward the substrate is distributed evenly along its length, perpendicularly to the length, whereas the tension of the elongated elements 200 is along the length of the elongated element 200. Thus, its reflective surface is curvilinear, rather than flat. Note, however, that for illustration purposes, in FIG. 12, the degree of sagging of the elongated element 200 is exaggerated relative to its length.

It has been found, however, that a center portion 202 (FIG. 12) of the elongated elements 200 remains approximately flat, such that a contrast ratio resulting from obtaining light diffracted only by the center portion 202 of each elongated element 200 is satisfactory. In practice it has been found that the approximately flat center portion 202 is approximately one-third the length between the post holes 110. Therefore, when the distance between post holes is 75 microns, the approximately flat center portion 202 is approximately 25 microns in length.

Figure 13:
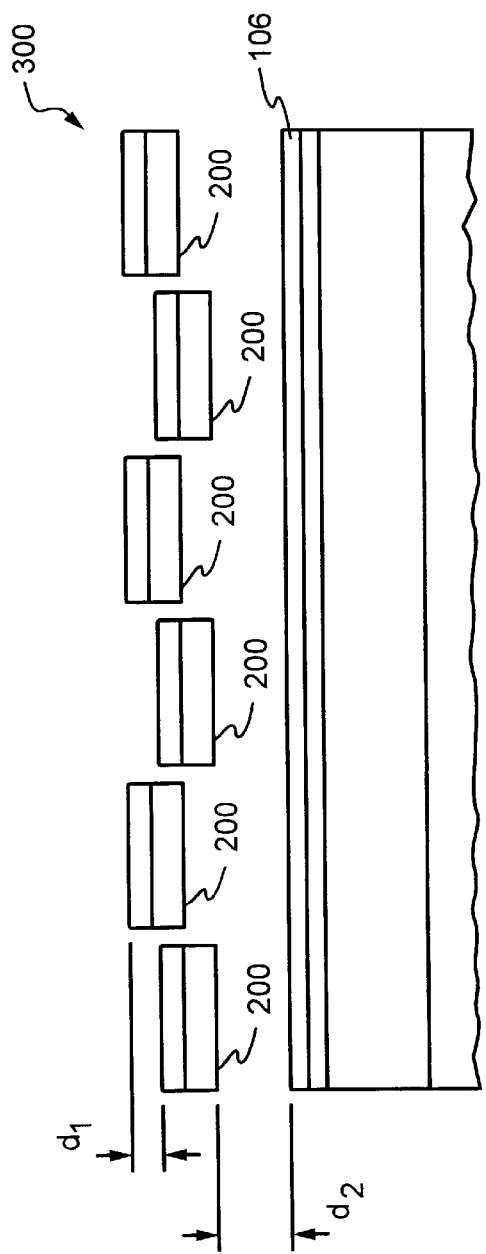
FIG. 13 illustrates a front sectional view of the display element of the GLV with alternate ones of the six elongated elements deformed, diffracting incident light.

FIG. 13 illustrates a front sectional view of the display element 300 with alternate ones of the elongated elements 200 deformed. The section illustrated in FIG. 13 is taken along the line B—B' illustrated in FIG. 12. The elongated ribbons 200 that are not moved substantially are held in a desired location by applying a bias voltage thereto. The deformed state in the elongated ribbons 200 that move is achieved by applying an appropriate drive voltage on the alternate ones of the elongated elements 200 with respect to the conductive layer 106. The perpendicular distance $d_1$ is approximately constant over the approximately flat center portion 202 (FIG. 12) and, thus, defines a grating amplitude for the GLV. The grating amplitude $d_1$ can be adjusted by adjusting the drive voltage on the driven elements elongated 200. This makes possible fine tuning of the GLV for an optimum contrast ratio.

For appropriately diffracting incident light having a single wavelength ($\lambda_1$), it is preferred that the GLV have a grating amplitude $d_1$ equal to one fourth of the wavelength of the incident light ($\lambda_1/4$) for a maximum contrast ratio in the displayed image. It will be apparent, however, that the grating amplitude $d_1$ need only result in a round trip distance equal to one-half the wavelength $\lambda_1$ plus a whole number of wavelengths $\lambda_1$ (i.e. $d_1=\lambda_1/4$, $3\ \lambda_1/4$, $5\ \lambda_1/4$ . . . , $N\lambda_1/2+\lambda_1/4$).

Referring to FIG. 13, it can be seen that the lower surface of each deformed elongated element 200 is separated from the surface of the substrate by a distance $d_2$. Thus, the elongated elements 200 do not make contact with the substrate during operation of the GLV. This avoids the problem in prior modulators of adhesion between the reflective ribbons and the substrate. This distance $d_2$ is preferably selected to be approximately two to the three times the distance $d_1$. Accordingly, in the deformed state, the elongated elements 200 travel approximately one-fourth to one-third of the distance $d_2$ to the substrate. The distance $d_2$ is determined by the thickness of the sacrificial layer 108 (FIGS. 5–6 and 8) plus the distance $d_1$.

Figure 4:
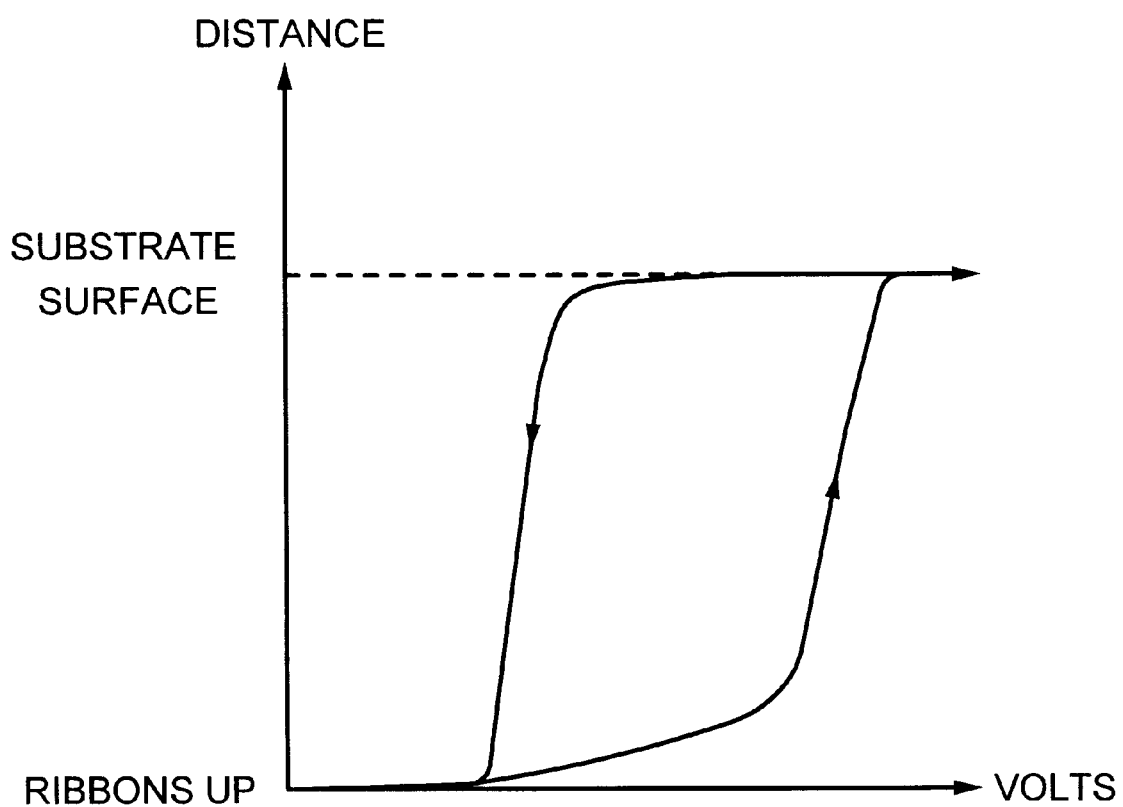
FIG. 4 illustrates a hysteresis curve for the prior art reflective deformable grating light modulator.

Referring to the hysteresis curve illustrated in FIG. 4, because the elongated elements 200 diffract the incident light by traveling only one-third to one-fourth of the distance to the surface of the substrate, hysteresis is avoided. Instead, starting from the undeformed state, the elongated elements 200 deform toward the substrate and, then, return to the undeformed state along the same voltage versus light intensity curve in each direction of travel. This is in contrast to the prior modulator illustrated in FIGS. 1–3 which encounters hysteresis when deforming to into diffracting state. This embodiment allows a continuous selection of the brightness by varying the drive voltage in a continuous manner on the driven elongated elements 200.

Because the end portions of each elongated element 200 are not approximately flat, if light diffracted by the end portions is collected and displayed, the resulting contrast ratio of the display image will tend to be unsatisfactory. Therefore, as explained herein, the present invention provides a light shield for preventing light diffracted from other than the approximately flat center portion 202 of each elongated element 200 from being utilized for forming the display image. In the alternative, the light could be optically manipulated so that it only impinges onto the approximately flat center portion 202. This approach avoids wasting light.

Figure 14:
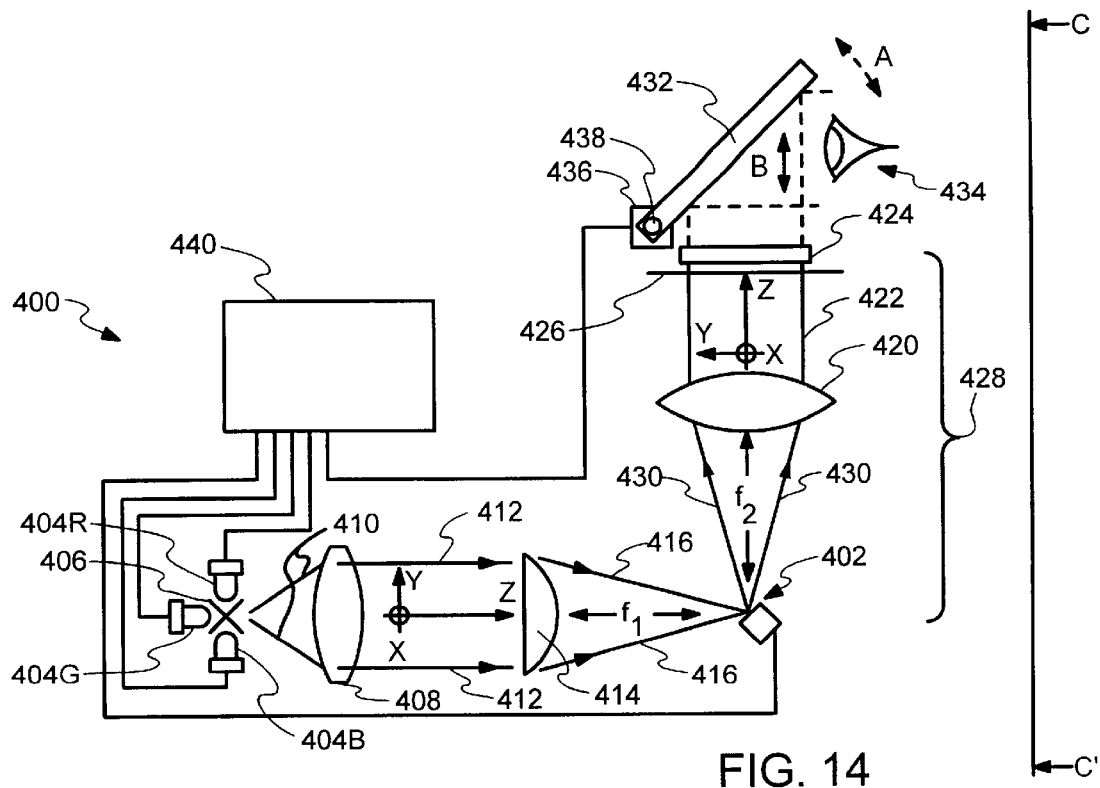
FIG. 14 illustrates top view of an optical display system utilizing the GLV.

FIG. 14 illustrates top view of an optical display system 400 utilizing the GLV array 402. An illumination arrangement for illuminating the GLV array 402, includes red, green, and blue light sources 404R, 404G and 404B, respectively. These light sources can be any convenient source or red, green and blue light and can be semiconductor light emitting devices such as light emitting diodes (LEDs) or semiconductor lasers, or separate diode pumped solid state lasers, or white light with a alternating filters such as a spinning disk with three filters to sequentially pass red, green and blue light. In system 400 light sources 404R, 404G, and 404B are assumed to be sources emitting in a generally symmetrical manner. A dichroic filter group 406 allows light from any one of these light sources to be directed toward a collimating lens 408 propagating generally along a system optical axis z. Dichroic filter groups or prism blocks which cause three light sources of different color to appear to an optical system to emanate from the same point of origin are well known in the optical art, for example, Philips prisms. Accordingly, a detailed description of such dichroic filter groups is not presented herein.

It is also known to use three separate image formation systems, one each for red, green and blue and to then optically combine these images. The system of the present invention could also comprise three display engines which are combined and then scanned to form a composite image.

Because the GLVs are formed using semiconductor processing techniques, it is possible to form three parallel linear arrays that are essentially perfectly aligned one to the other. Three illumination systems, one each for red, green and blue can be configured to impinge their respective color of light onto a single one of the three essentially perfectly aligned GLV linear arrays. In this way, alignment of the composite image is easier than for conventional composite color systems.

One common problem in conventional color display systems is commonly known as color break up. This results from such systems displaying a red frame, a green frame and a blue frame, in any convenient sequence. This technique is known as frame sequential color. If an object passes between the viewer and the displayed image a ghost of that object in one of the colors will appear in the display. Similarly, if the viewer quickly turns their head an artifact of the frame sequential color will appear.

Because the GLV technology can operate at sufficient bandwidth, the system can be made to operate to provide each of the three display colors for each row of the display as it is scanned. The inventors have coined the phrase 'line sequential color' to describe this technique. The deleterious artifacts of frame sequential color are not present.

In line sequential color, as the image is scanned each of the three colors is presented to the linear array of the GLV in sequence. In analogous terms, all three colors are presented in what is approximately equal to a single display line in a conventional pixellated display.

The image is formed by scanning a linear array of GLVs. The elongated elements in the linear array are all parallel and perpendicular to the length of the linear array. This avoids any discreetly displaying of adjacent elements. Thus, there is no pixellation between adjacent display elements such as is present in conventional LCD or CRT displays. Further, because the array is smoothly scanned in a direction perpendicular to the linear array, there can be no pixellation between the display in that direction either. In this way, the image quality is vastly improved over that of conventional display technologies.

Lens 408 is illustrated, for simplicity as a simple "spherical" lens, i.e having equal refractive power in the x and y axes. In FIG. 14, the y axis is in the plane of the illustration and the x axis is perpendicular to the plane of the illustration. The lens 408 collimates light from the light source in both axes. Those familiar with the art to which the present invention pertains, will recognize however, that light output from an end-emitting semiconductor laser is more divergent in one transverse (x or y) axis than the other and is astigmatic. Means for collimating the output beam of such a laser and expanding it to a desired size are well-known in the optical art and may require one or more spherical, aspherical, toroidal, or cylindrical (spherical and aspherical) lens elements. Lens 408 is intended to represent a group of one or more such elements.

Divergent light 410 from a symmetrically emitting light source 404 passes through lens 408 and is collimated in both the x and y axes. Bi-axially collimated light 412 is then passed through a cylindrical lens 414. The term "cylindrical" here defining that lens 414 has refractive power in one axis (here, y) only. Those familiar with the optical art will recognize that the surface of the lens 414 may be other than circularly cylindrical. The function of lens 414 is to cause bi-axially collimated light 412 passing therethrough to converge (FIG. 14, lines 416) in the y axis, and remain collimated (FIG. 15 lines 418) in the x axis. It should be noted here that lens 414 may also be formed from one or more optical elements as discussed above, and is shown as a single element for simplicity.

GLV array 402 is located at a distance from cylindrical lens 414 of about a focal length ($f_1$) of the lens. GLV array 402 is aligned in the x axis, on the system optical axis z which corresponds to the optical axis of lenses 408 and 414. The operating surface of the GLV (elongated elements 200) is inclined to the z axis. In FIG. 14, GLV array 402 is inclined as 45 degrees to the axis, which effectively folds the z axis 90 degrees . This selection of inclination of the GLV array 402 is made here for convenience of illustration and should not be considered limiting.

Figure 15:
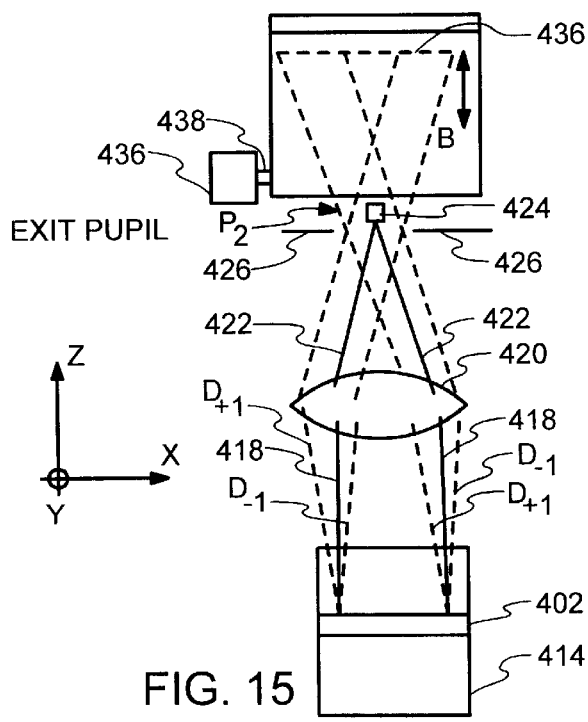
FIG. 15 illustrates a side view of the optical display system illustrated in FIG. 14 taken along the line C—C'.

FIG. 15 illustrates a side view of the optical display system illustrated in FIG. 14 taken along the line C—C'. Referring to FIG. 15, light incident on an operating GLV array 402, creates a reflected beam (418) and plus and minus first-order diffracted beams designated by $D_{+1}$ and $D_{-1}$ respectively. These diffracted beams are inclined to the z axis, in the x axis. In the y axis, the diffracted and reflected beams are equally divergent. the diffracted and reflected beams then pass through a magnifying (positive) lens 420 which is separated from GLV array 402 by a focal length $f_2$ of the lens. Lens 420 is shown as a single element from simplicity, but in practice lens 420 may include two or more elements. Lens 420 provides in effect an eyepiece lens for system 400 and is preferably on of the well-known group of eyepiece lens types, consisting of Huygens, Ramsden, Kellner, Plössel, Abbe, König, and Erfle types.

In the x axis, the reflected beam 422 converges to a focal point on the z axis, at which is placed an elongated stop 423 at about an external telecentric exit pupil $P_2$ of lens 420. In addition a shield 426 is placed in the area of the pupil $P_2$ of lens 420 to shield light diffracted from portions of the elongated elements 200 of the GLV array 402 other that light diffracted from the approximately flat center portion 202 of each elongated element. Thus, the shield has a slit that is preferably dimensioned so as to only pass light ($D_{+1}$, $D_{-1}$) diffracted from the approximately 25 micron center portion 202 of each elongated element 200.

The Schlieren optics of system 400 can be defined as being a part of a telecentric optical arrangement 428 including GLV array 402 magnifying eyepiece lens 420 and stop 424, with GLV array 402 at about an external object position of lens 420 and stop 424 at about an external (exit) pupil of lens 420. A telecentric system is a system in which the entrance pupil and/or the exit pupil is located at infinity. It is widely used in optical systems designed for metrology because it tends to reduce measurement or position error caused by slight defocusing of the system. This tendency permits some tolerance in placement of stops and other components of the system in general, and is exploited in certain embodiments of the present invention discussed further hereinbelow.

In the y axis (FIG. 14) divergent reflected light 430 (and diffracted light) is collimated by lens 420. Stop 424 is aligned in the y axis, and intercepts the reflected light. Shield 426 absorbs diffracted light other than light diffracted from the approximately flat center portions 202 of the GLV array 402. Stop 424 may be selected to be absorbing or reflecting. If stop 424 is reflecting, reflected light from is returned to GLV array 420. Diffracted beams $D_{+1}$ and $D_{-1}$, however, being inclined to the z axis and the corresponding incident and reflected beams, converge to focal points about and below (alternatively, on opposite sides of) stop 424 and with the slit of shield 426, thereby passing through exit pupil $P_2$ without being intercepted.

A scanning mirror 432 is located such as to intercept the diffracted beams and direct them toward a viewer's eye 434. What the viewer sees is a magnified virtual image (at infinity) of GLV array 402. This image is represented in FIG. 5 by line 436, recognizing, of course, that there is no real image here. It will be apparent that the line of the GLV array 402 can represent a row or a column of an image to be displayed. The appropriate remaining rows or columns are then formed as the scan progresses. It is possible that other scanning modes can be used, such as diagonally.

The elongated elements 200 of GLV array 402 are operated to represent, sequentially, different lines of M×N display where M is the number of display elements per line, and N is the number of lines in the display. Each display element 300 includes multiple elongated elements 200, as discussed above. GLV array 402 may be defined generally as representing, a one-dimensional array of light valves, or one row of display elements or pixels. In the magnified virtual image, these pixels will have a relative brightness determined by the operating state of ribbon or ribbons 12 of GLV array 10.

Scanning mirror 432 is moved, angularly, by a drive unit 436 about an axis 438 as illustrated by arrow A (FIG. 14), scanning the diffracted beams, and thus the magnified virtual image, linearly, across the field of view of the viewer, as indicated by arrow B, to represent sequential lines of the display. Mirror 432 is moved fast enough to cause the scanned virtual image to appear as a two-dimensional image to the viewer. The pivotable scanning mirror 432 can be replace with other types of mirror arrangements such as a rotating faceted polygon mirror.

Microprocessor-based electronic control circuitry 440 is arranged to accept video data and is coupled to GLV array 402 for using the video data to operate the elongated elements 200 of the GIV array 402 for modulating light diffracted therefrom. The circuitry 440 is arranged such that the light in diffracted beams $D_{+1}$, and $D_{-1}$, is modulated to represent sequential lines of a two-dimensional image representing the video data, as noted above. Control circuitry 440 is also coupled to scanning mirror drive unit 436 to synchronize the display of sequential lines and to provide that sequential frames of the image begin at an extreme of the angular excursion range of scanning mirror 432. The speed of the scanning can be controlled to be sinusoidal, saw toothed or any other convenient speed algorithm. All that is necessary is that the scanning speed be synchronized with the presentation of the data to the GLV array 402.

Control circuitry 440 is also coupled to light sources 404R, 404G, and 404B for switching the sources sequentially, cooperative with operation of GLV array 402 to provide sequential red, green and blue resolution image of the array, which, together, represent one resolution line of colored two-dimensional image. In this arrangement, the elongated members 200 of each display element 300 are appropriately modulated while each of the light sources 404R, 404G and 404B are sequentially active to provide an appropriate proportion of each of red, green and blue diffracted light for the display element 300 while the corresponding line of the image is displayed to the viewer. This modulation occurs at a rate that is sufficiently high that the viewer perceives an appropriate combined color for each display element 300.

In an alternate arrangement, light sources 404R, 404G and 404B are activated simultaneously to illuminate GLV array 402 and two additional arrays (not shown) via a dichroic prism block (not shown) placed between lens 420 and the three GLV arrays. Each GLV array would then be arranged to modulate a particular one of the three primary color components red, green, and blue of the image. The dichroic prism block may be of any well-known type for example an above mentioned Phillips prism block, and would in this case be arranged such that each GLV array appeared to be located at the same distance from, and inclination to, lens 420. In such arrangement, for providing a colored image, light sources 404R, 404G and 404B could be replaced by a single white light source, and dichroic prism block 406 omitted.

It should be noted here in the FIG. 14, viewer's eye 434 is illustrated in a less than ideal position for properly viewing a magnified virtual image of the display of system 400. Ideally, for viewing such an image, the viewer's eye should be located at about exit pupil $P_2$. This is difficult because of mirror 432, which is preferably also located at about this exit pupil. This difficulty can be overcome by optically relaying an image of the exit pupil away from the mirror, to a position at which it is easy to locate a viewers eye, thereby allowing the scanning mirror 432 and the viewer's eye each to be located at about a pupil position.

Figure 16:
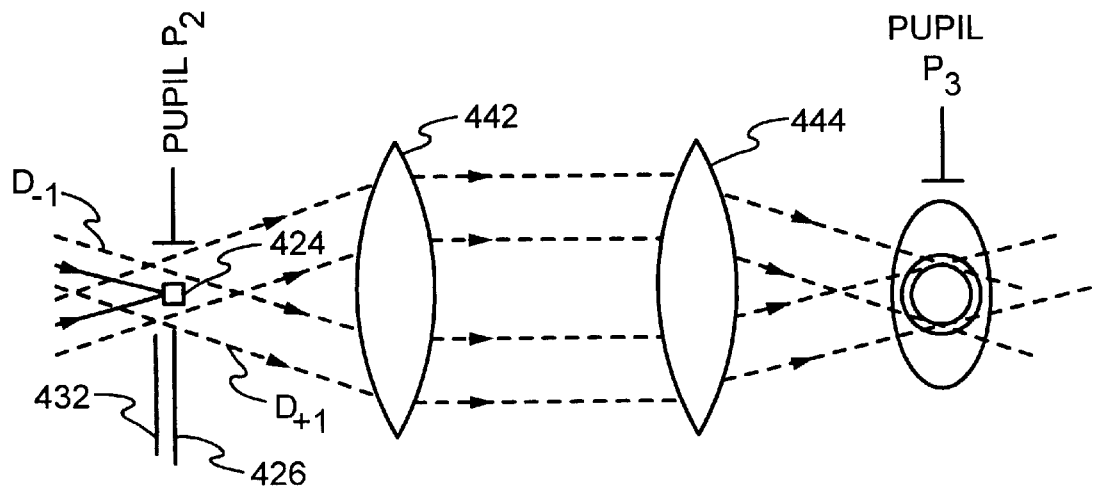
FIG. 16 illustrates a side cross sectional view of an eyepiece arrangement for use with the optical display system illustrated in FIG. 14 including an exit pupil.

One means of relaying an image of exit pupil $P_2$ is illustrated in FIG. 16 wherein the optical arrangement is shown as optically "unfolded" with scanning mirror 432 represented as a line at exit pupil $P_2$ of lens 420, that being one preferred position for the scanning mirror 432. In addition, shield 426 is placed in the area of the pupil $P_2$. Here, pupil-relaying is accomplished by two lenses 442 and 444 of the same focal length, which are spaced apart by a distance equal to twice that focal length to form a unit magnification telecentric relay which places an image $P_3$ of exit pupil $P_2$ a focal length of lens 444 away from the lens 444, providing adequate eye-relief from lens 444. Those skilled in the art will recognize, of course, that lenses 442 and 444 may include more than one lens element, and further, that the telecentric relay arrangement illustrated in FIG. 16 is not the only possible optical arrangement for relaying a pupil image.

Figure 17:
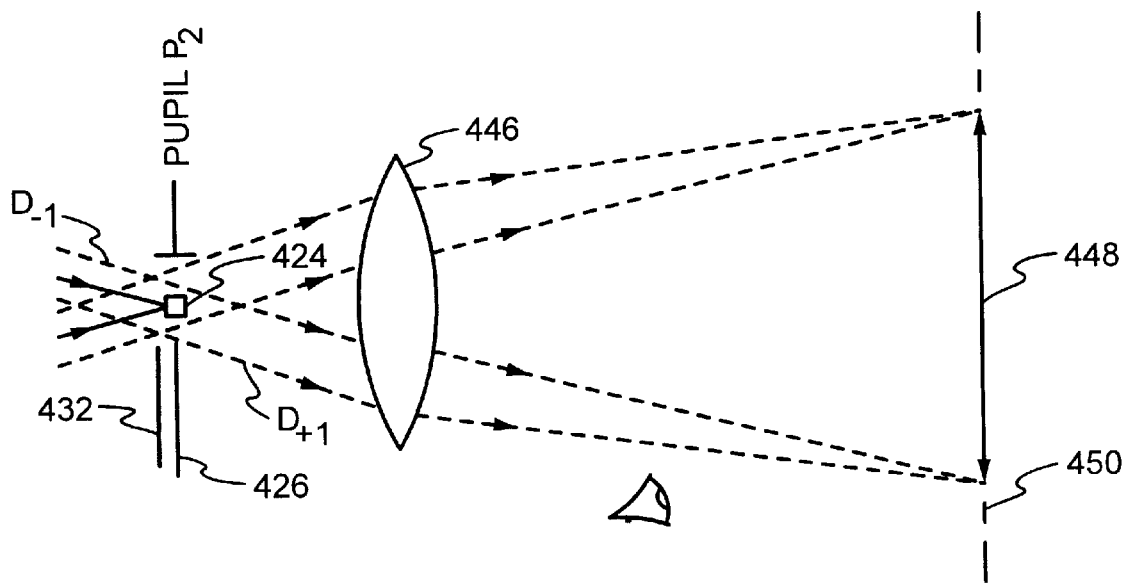
FIG. 17 illustrates a side cross sectional view of a display screen arrangement for use with the optical display system illustrated in FIG. 14 including the exit pupil.

Referring now to FIG. 17, (where again the optical system is illustrated as "unfolded" with scanning mirror 432 represented as a line at exit pupil $P_2$ of lens 420, that being, here also, one preferred position for the scanning mirror 432). Shield 426 is also placed in the area of the pupil $P_2$. Eyepiece lens 420 may also be used as one element, or group of elements, for projecting a magnified real image of the GLV array 402 on a screen or on a recording medium, such as would be required to provide a projection display or a device for recording or printing an image. here, a lens (or group of lens elements) 446 is positioned to focus a magnified real image 448 (here, the width) of GLV array 402 at a finite distance from lens 446. This image could be focussed in a plane 450 which could be a viewing screen for providing a projected (apparent) two-dimensional image, or on a recording medium such a photographic film or paper. In the case of a recorded or printed image, scan mirror 432 could be eliminated, and scanning achieved by moving a recording or printing medium in the scan direction, which, in FIG. 17 is perpendicular to the plane of the illustration, i.e., perpendicular to the orientation of the image. This mechanical scanning motion would, of course, need to be synchronized with image generation by electric circuitry 440 as in system 400.

Figure 18:
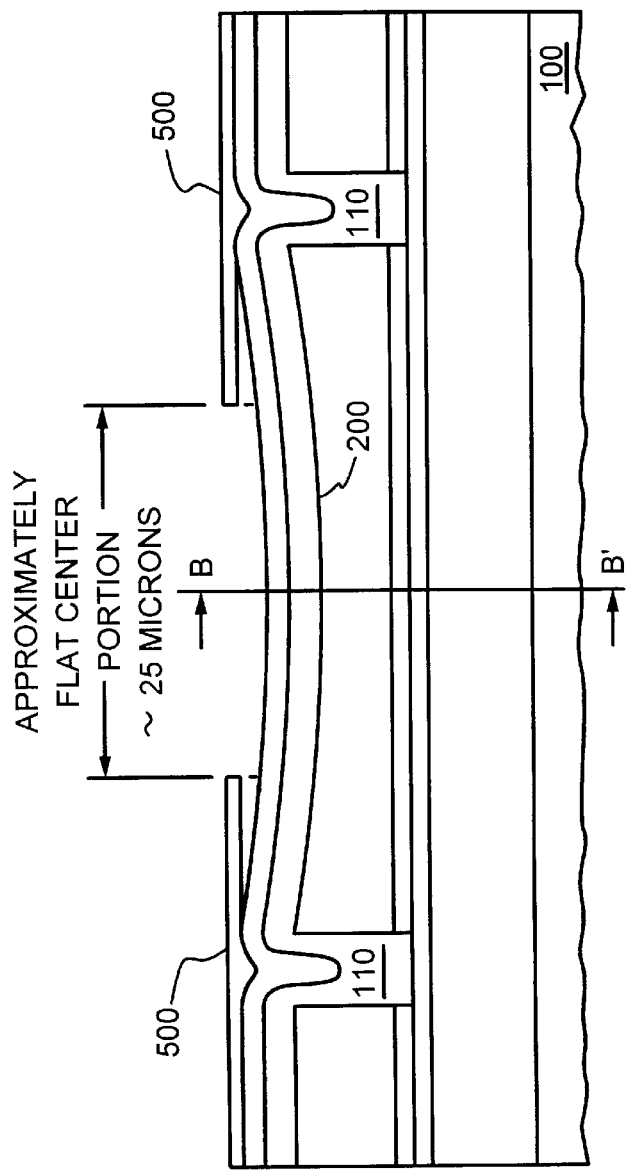
FIG. 18 illustrates an alternate embodiment of the present invention for avoiding display of light diffracted from other than an approximately flat center portion of the elongated elements.

In an alternate embodiment, rather than utilizing the shield 426 illustrated in FIGS. 14–17 to prevent diffracted light from other than the approximately flat center portion 202 (FIG. 12) of each elongated element 200 of the GLV array 402 from reaching the viewer, a reflective element 500 is disposed over the outermost portions of each elongated element 200. A side sectional view of such a reflective element 500 is illustrated in FIG. 18 disposed over a deformed elongated element 200. As can be seen from FIG. 18, the approximately flat center portion 202 (FIG. 12) of the elongated element 200 remains exposed to incident light while the outer portions are covered by the reflective element 500. The reflective element 500 reflects incident light. Therefore, this reflected light does not reach the viewer, nor does it affect the image perceived by the viewer. The reflective element 500 illustrated in FIG. 18 is preferably sufficiently thin that it is in substantially the same plane as the approximately flat center portion 202 of each elongated element 200 (in the undeformed state). The reflective element 500 can also be located in a plane parallel to, spaced apart from, the reflective surface of the elongated elements 200 (in the undeformed state) by a distance $d_3$ equal to a whole number N of half wavelengths for the expected incident light (i.e. $d_3=0, \lambda_{\text{-}1}/2, \lambda_{\text{-}1}, 3\lambda_{\text{-}1}/2, 2\lambda_{\text{-}1}, \ldots, N\lambda_{\text{-}1}/2)$.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

The embodiment described principally above is for forming a display for human viewing. Other types of 'displays' are also contemplated within the present invention. For example, an image could be formed on a rotating drum for transfer to paper in a printing process. In such applications, the light source could also be ultraviolet or infrared. Such an image is not visible to a human but is equally useful.

Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. An optical system for displaying an image comprising:
   a. a plurality of elongated elements, each element having an approximately flat reflective surface disposed between two ends, the elements arranged parallel to each other and suspended by their respective ends above a substrate, the elongated elements grouped according to a plurality of display elements arranged in a single linear array;
   b. means for deforming selected ones of the elongated elements toward the substrate thereby entering a deformed state wherein the approximately flat reflective surface of each selected element moves toward the substrate by a grating amplitude without the selected elongated elements contacting the substrate such that when the elongated elements corresponding to a display element are undeformed, an incident beam of light is reflected by the display element, and further such that when alternate ones of elongated elements corresponding to the display element are selectively deformed, the incident beam of light is diffracted by the display element, wherein a distance of movement of the selected ones of the elongated elements determines an intensity for the corresponding display element;

c. an optical arrangement for forming the image according to a respective intensity formed by each display element; and d. a reflective element disposed over the two ends of each elongated element in a plane parallel to the reflective surfaces of undeformed elongated elements by distance equal to a whole number or zero multiplied by half the wavelength of the incident beam of light.

2. The modulator according to claim 1 wherein the light is in a range of wavelengths.

3. The modulator according to claim 1 wherein the light is in a range of visible light wavelengths.

4. The modulator according to claim 1 wherein the light is in a range of ultraviolet light wavelengths.

5. The modulator according to claim 1 wherein the light is in a range of infrared light wavelengths.

6. The modulator according to claim 1 wherein the selected ones of the elongated elements moves approximately one-fourth the wavelength of the light.

7. The modulator according to claim 1 wherein the selected ones of the elongated elements move a controllable distance selected to provide a desired brightness of modulated light.

8. The modulator according to claim 1 wherein the grating amplitude is approximately one-fourth to one-third of a distance between undeformed elongated elements and the substrate.

9. The modulator according to claim 1 wherein the approximately flat reflective surface comprises approximately one-third of a length of the corresponding elongated element.

10. The modulator according to claim 1 wherein the elongated elements are grouped according to a plurality of display elements arranged in a single linear array wherein when the elongated elements corresponding to a display element are undeformed, the incident beam of light is reflected by the display element, and when alternate ones of elongated elements corresponding to the display element are selectively deformed, the incident beam of light is diffracted by the display element.

11. The modulator according to claim 10 wherein an image from the single linear array is scanned to form a two dimensional image.

12. The modulator according to claim 11 wherein the image from the single linear array is scanned sufficiently fast to be integrated into a single nonflickering image by a user's eye.

13. The modulator according to claim 12 wherein each of a plurality of colored light sequentially impinges on the modulator as the image is scanned to form an image without color break up.

14. The modulator according to claim 12 wherein the two dimensional image is not pixellated.

15. The modulator according to claim 10 wherein a distance of movement of the selected ones of the elongated elements determines an intensity for the corresponding display element.

16. The modulator according to claim 10 wherein a ratio of a period of reflection to a period of diffraction determines an intensity for the corresponding display element.

17. The modulator according to claim 15 further comprising an optical system for forming an image according to a respective intensity formed by each display element.

18. The modulator according to claim 17 further comprising means for only illuminating the approximately flat center portions with the beam of light.

19. The modulator according to claim 17 further comprising means for preventing light diffracted by other than the approximately flat center portions from being displayed by the optical system.

20. The modulator according to claim 19 wherein the means for preventing comprises a light shield having a slit for passing light diffracted by the approximately flat center portions and for blocking light diffracted by other than the approximately flat center portions.

21. The modulator according to claim 19 where the means for preventing comprises a reflective element disposed over the two ends of each elongated element in a plane parallel to the reflective surfaces of undeformed elongated elements by distance equal to a whole number or zero multiplied by half the wavelength of the incident beam of light.

22. An optical system for displaying an image comprising:

a. a plurality of elongated elements, each element having an approximately flat reflective surface disposed between two ends, the elements arranged parallel to each other and suspended by their respective ends above a substrate, the elongated elements grouped according to a plurality of display elements arranged in a single linear array;

b. means for deforming selected ones of the elongated elements toward the substrate surface thereby entering a deformed state wherein the approximately flat reflective surface of each selected element moves toward the substrate by a grating amplitude of a whole number or zero multiplied by one-half a wavelength of an incident beam of light plus approximately one-fourth the wavelength of the incident beam of light, without the selected elongated elements contacting a surface of the substrate such that when the elongated elements corresponding to a display element are undeformed, an incident beam of light is reflected by the display element, and further such that when alternate ones of elongated elements corresponding to the display element are selectively deformed, the incident beam of light is diffracted by the display element, wherein a ratio of a period of reflection to a period of diffraction determines an intensity for the corresponding display element;

c. an optical arrangement for forming the image according to a respective intensity formed by each display element; and d. a reflective element disposed over the two ends of each elongated element in a plane parallel to the reflective surfaces of undeformed elongated elements by distance equal to a whole number or zero multiplied by half the wavelength of the incident beam of light.

23. The modulator according to claim 22 wherein the grating amplitude is approximately one-fourth to one-third of a distance between undeformed elongated elements and the substrate.

24. The modulator according to claim 22 wherein the approximately flat reflective surface comprises approximately one-third of a length of the corresponding elongated element.

25. The modulator according to claim 22 wherein the elongated elements are grouped according to a plurality of display elements arranged in a single column wherein when the elongated elements corresponding to a display element are undeformed, the incident beam of light is reflected by the display element, and when alternate ones of elongated elements corresponding to the display element are selectively deformed, the incident beam of light is diffracted by the display element.

26. The modulator according to claim 25 wherein a distance of movement of the selected ones of the elongated elements determines an intensity for the corresponding display element.

27. The modulator according to claim 25 wherein a ratio of a period of reflection to a period of diffraction determines an intensity for the corresponding display element.

28. The modulator according to claim 27 further comprising an optical system for forming an image according to a respective intensity formed by each display element.

29. The modulator according to claim 28 further comprising means for preventing light diffracted by other than the approximately flat center portions from being displayed by the optical system.

30. The modulator according to claim 29 wherein the means for preventing comprises a light shield having a slit for passing light diffracted by the approximately flat center portions and for blocking light diffracted by other than the approximately flat center portions.

31. An optical system for displaying an image comprising:
   a. a plurality of elongated elements, each having an approximately flat reflective surface disposed between two ends, the elements arranged parallel to each other and suspended by their respective ends above a substrate by a distance the elements grouped according to a plurality of display elements arranged in a single column;
   b. means for placing selected ones of the elongated elements in a deformed state wherein the incident beam of light is diffracted by moving the approximately flat reflective surface of the selected ones toward the substrate by a grating amplitude of approximately one-fourth to one-third of the distance and for returning the selected ones of the elongated elements to an undeformed state wherein the incident beam of light is reflected, wherein a ratio of a period of reflection to a period of diffraction determines an intensity for the corresponding display element;
   c. an optical arrangement for forming the image according to a respective intensity formed by each display element; and
   d. a reflective element disposed over the two ends of each elongated element in a plane parallel to the reflective surfaces of undeformed elongated elements by distance equal to a whole number or zero multiplied by half the wavelength of the incident beam of light.

32. The modulator according to claim 31 wherein the approximately flat reflective surface comprises approximately one-third of a length of the corresponding elongated element.

33. The modulator according to claim 31 wherein the elongated elements are grouped according to a plurality of display elements arranged in a single column and wherein a distance of movement of the selected ones of the elongated elements determines an intensity for the corresponding display element.

34. The modulator according to claim 31 wherein the elongated elements are grouped according to a plurality of display elements arranged in a single column wherein a ratio of a period of reflection to a period of diffraction determines an intensity for the corresponding display element.

35. The modulator according to claim 34 further comprising an optical system for forming an image according to a respective intensity formed by each display element.

36. The modulator according to claim 35 further comprising means for preventing light diffracted by other than the approximately flat center portions from being displayed by the optical system.

37. The modulator according to claim 36 wherein the means for preventing comprises a light shield having a slit for passing light diffracted by the approximately flat center portions and for blocking light diffracted by other than the approximately flat center portions.

38. A method of forming an image comprising steps of:
   a. causing a beam of light to impinge upon a plurality of elongated elements, each element having an approximately flat reflective surface disposed between two ends, the elements arranged parallel to each other and suspended by their respective ends above a substrate by a distance, the elements grouped according to a plurality of display elements arranged in a single column;
   b. deforming selected ones of the elongated elements toward the substrate by moving the approximately flat reflective surface of the selected ones toward the substrate by a grating amplitude of approximately one-fourth to one-third of the distance thereby causing the selected ones to be in a deformed state wherein the incident beam of light is diffracted, wherein a ratio of a period of reflection to a period of diffraction determines an intensity for the corresponding display element;
   c. returning the selected ones of the elongated elements to an undeformed state wherein the incident beam of light is reflected;
   d. forming an image according to a respective intensity formed by each display element; and
   e. preventing light diffracted by other than the approximately flat center portions from being displayed where the means for preventing comprises a reflective element disposed over the two ends of each elongated element in a plane parallel to the reflective surfaces of undeformed elongated elements by distance equal to a whole number or zero multiplied by half a wavelength of the beam of light.

39. The method according to claim 38 wherein the grating amplitude is approximately one-fourth to one-third of a distance between undeformed elongated elements and the substrate.

40. The method according to claim 38 wherein the approximately flat reflective surface comprises approximately one-third of a length of the corresponding elongated element.

41. The modulator according to claim 38 wherein the elongated elements are grouped according to a plurality of display elements arranged in a single column and wherein a distance of movement of the selected ones of the elongated elements determines an intensity for the corresponding display element.

42. The method according to claim 38 wherein the elongated elements are grouped according to a plurality of display elements arranged in a single column wherein a ratio of a period of reflection to a period of diffraction determines an intensity for the corresponding display element.

43. The method according to claim 42 further comprising an optical system for forming an image according to a respective intensity formed by each display element.

44. The method according to claim 43 further comprising means for preventing light diffracted by other than the approximately flat center portions from being displayed by the optical system.

45. The method according to claim 44 wherein the means for preventing comprises a light shield having a slit for passing light diffracted by the approximately flat center portions and for blocking light diffracted by other than the approximately flat center portions.

46. A method of forming an image comprising steps of:
   a. causing a beam of light to impinge upon a plurality of elongated elements, each element having an approximately flat reflective surface disposed between two ends, the elements arranged parallel to each other and suspended by their respective ends above a substrate, the elements grouped according to a plurality of display elements arranged in a single column;
   b. deforming selected ones of the elongated elements toward the substrate surface thereby causing the selected ones to be in a deformed state wherein the approximately flat reflective surface of each selected element is moved toward the substrate by a grating amplitude of a whole number or zero multiplied by one-half the wavelength of the beam of light plus approximately one-fourth the wavelength of the incident beam of light, without the selected elongated elements contacting a surface of the substrate, wherein when the elongated elements corresponding to a display element are undeformed, the beam of light is reflected by the display element, and when alternate ones of elongated elements corresponding to the display element are selectively deformed, the beam of light is diffracted by the display element, wherein a ratio of a period of reflection to a period of diffraction determines an intensity for the corresponding display element;
   c. forming an image according to a respective intensity formed by each display element; and
   d. preventing light diffracted by other than the approximately flat center portions from being displayed where the means for preventing comprises a reflective element disposed over the two ends of each elongated element in a plane parallel to the reflective surfaces of undeformed elongated elements by distance equal to a whole number or zero multiplied by half a wavelength of the beam of light.

47. The method according to claim 46 wherein the grating amplitude is approximately one-fourth to one-third of a distance between undeformed elongated elements and the substrate.

48. The method according to claim 46 wherein the approximately flat reflective surface comprises approximately one-third of a length of the corresponding elongated element.

49. The method according to claim 46 wherein the elongated elements are grouped according to a plurality of display elements arranged in a single column wherein when the elongated elements corresponding to a display element are undeformed, the incident beam of light is reflected by the display element, and when alternate ones of elongated elements corresponding to the display element are selectively deformed, the incident beam of light is diffracted by the display element.

50. The method according to claim 49 wherein a distance of movement of the selected ones of the elongated elements determines an intensity for the corresponding display element.

51. The method according to claim 49 wherein a ratio of a period of reflection to a period of diffraction determines an intensity for the corresponding display element.

52. The method according to claim 51 further comprising an optical system for forming an image according to a respective intensity formed by each display element.

53. The method according to claim 52 further comprising means for preventing light diffracted by other than the approximately flat center portions from being displayed by the optical system.

54. The method according to claim 53 wherein the means for preventing comprises a light shield having a slit for passing light diffracted by the approximately flat center portions and for blocking light diffracted by other than the approximately flat center portions.

55. A modulator for modulating an incident beam of light having a wavelength, the modulator comprising:
   a. a plurality of elongated elements, each having an approximately flat reflective surface disposed between two ends, the elements arranged parallel to each other and suspended by their respective ends by integrally formed posts above a substrate; and
   b. means for deforming selected ones of the elongated elements toward the substrate thereby entering a deformed state wherein the approximately flat reflective surface of each selected element moves toward the substrate by a grating amplitude without the selected elongated elements contacting the substrate.

56. A modulator for modulating an incident beam of light having a wavelength within a visible range of wavelengths, the modulator comprising:
   a. a plurality of elongated elements, each having an approximately flat reflective surface disposed between two ends, the elements arranged parallel to each other and suspended by their respective ends by integrally formed posts above a substrate; and
   b. means for deforming selected ones of the elongated elements toward the substrate surface thereby entering a deformed state wherein the approximately flat reflective surface of each selected element moves toward the substrate by a grating amplitude of a whole number or zero multiplied by one-half the wavelength of the incident beam of light plus approximately one-fourth the wavelength of the incident beam of light, without the selected elongated elements contacting a surface of the substrate.

57. A modulator for modulating an incident beam of light, the modulator comprising:
   a. a plurality of elongated elements, each having an approximately flat reflective surface disposed between two ends, the elements arranged parallel to each other and suspended by their respective ends by integrally formed posts above a substrate by a distance; and
   b. means for placing selected ones of the elongated elements in a deformed state wherein the incident beam of light is diffracted by moving the approximately flat reflective surface of the selected ones toward the substrate by a grating amplitude of approximately one-fourth to one-third of the distance and for returning the selected ones of the elongated elements to an undeformed state wherein the incident beam of light is reflected.

58. A method of modulating an incident beam of light having a wavelength, the method comprising steps of:
   a. causing the beam of light to impinge upon a plurality of elongated elements, each having an approximately flat reflective surface disposed between two ends, the elements arranged parallel to each other and suspended by their respective ends by integrally formed posts above a substrate by a distance;

b. deforming selected ones of the elongated elements toward the substrate by moving the approximately flat reflective surface of the selected ones toward the substrate by a grating amplitude of approximately one-fourth to one-third of the distance thereby causing the selected ones to be in a deformed state wherein the incident beam of light is diffracted; and c. returning the selected ones of the elongated elements to an undeformed state wherein the incident beam of light is reflected.

59. A method of modulating an incident beam of light having a wavelength, the method comprising steps of:

a. causing the beam of light to impinge upon a plurality of elongated elements, each having an approximately flat reflective surface disposed between two ends, the elements arranged parallel to each other and suspended by their respective ends by integrally formed posts above a substrate; and b. deforming selected ones of the elongated elements toward the substrate surface thereby causing the selected ones to be in a deformed state wherein the approximately flat reflective surface of each selected element is moved toward the substrate by a grating amplitude of a whole number or zero multiplied by one-half the wavelength of the incident beam of light plus approximately one-fourth the wavelength of the incident beam of light, without the selected elongated elements contacting a surface of the substrate.

60. A method of forming a light modulator on a substrate, the light modulator for modulating an incident beam of light having a wavelength within a visible range of wavelengths, the method comprising steps of:

a. forming a sacrificial layer on the substrate, wherein the sacrificial layer has a thickness that is approximately equal to the wavelength of the beam of light;

b. etching at least four post holes through the sacrificial layer;

c. forming posts in the post holes;

d. forming at least two elongated elements over the sacrificial layer, each elongated element coupled to the substrate by two of the posts one at each end of each elongated element, each elongated element having a reflective surface; and e. removing the sacrificial layer.

61. The method according to claim 60 wherein the thickness is within a range of 200 to 2000 nm.

* * * * *

UNITED STATES PATENT AND TRADEMARK OFFICE
CERTIFICATE OF CORRECTION

PATENT NO. : 6,215,579 B1
DATED : April 10, 2001
INVENTOR(S) : David M. Bloom et al.

It is certified that error appears in the above-identified patent and that said Letters Patent is hereby corrected as shown below:

REFERENCES CITED, Item [56],
The following U.S. Patent Documents need to be added:

| | | | |
|---|---|---|---|
| -- 3,781,465 | 12/25/73 | Ernstoff et al. | 178/5.4 BD |
| 3,783,184 | 01/01/74 | Ernstoff et al. | 178/5.4 BD |
| 3,862,360 | 01/21/75 | Dill et al. | 178/7.3 D |
| 3,915,548 | 10/28/75 | Opittek et al. | 350/3.5 |
| 3,943,281 | 03/09/76 | Keller et al. | 178/7.5 D |
| 3,991,416 | 11/09/76 | Byles et al. | 340/324 R |
| 4,006,968 | 02/08/77 | Ernstoff et al. | 350/160 LC |
| 4,090,219 | 05/16/78 | Ernstoff et al. | 358/59 |
| 4,100,579 | 07/11/78 | Ernstoff et al. | 358/230 |
| 4,195,915 | 04/01/80 | Lichty et al. | 350/345 |
| 4,205,428 | 06/03/80 | Ernstoff et al. | 29/592 R |
| 4,311,999 | 01/19/82 | Upton et al. | 340/755 |
| 4,343,535 | 8/10/82 | Bleha, Jr. | 350/342 |
| 4,374,397 | 02/15/83 | Mir | 358/75 |
| 4,389,096 | 06/21/83 | Hori et al. | 350/339 R |
| 4,687,326 | 08/18/87 | Corby, Jr. | 356/5 |
| 4,797,694 | 01/10/89 | Agostinelli et al. | 346/160 |
| 4,801,194 | 01/31/89 | Agostinelli et al. | 350/356 |
| 5,192,864 | 03/09/93 | McEwen et al. | 250/234 |
| 5,296,891 | 03/22/94 | Vogt et al. | 355/67 |
| 5,339,177 | 08/16/94 | Jenkins et al. | 359/35 |
| 5,404,485 | 04/04/95 | Ban | 395/425 |
| 5,471,341 | 11/28/95 | Warde et al. | 359/293 |
| 5,521,748 | 05/28/96 | Sarraf | 359/321 |
| 5,668,611 | 09/16/97 | Ernstoff et al. | 348/771 --. |

The following Foreign Patent Docuuments need to be added:

| | | | |
|---|---|---|---|
| -- 0 306 308 A2 | 03/08/89 | EP | H04N 3/14 |
| 0 528 646 A1 | 02/24/93 | EP | G09G 3/02 |
| 0 550 189 A1 | 07/07/93 | EP | G02F 1/315 |
| 0 689 078 A1 | 12/27/95 | EP | G03B 26/08 |
| 0 801 319 A1 | 10/15/97 | EP | G02B 26/00 |
| WO 96/41217 | 12/19/96 | WIPO | G02B 5/18 |
| WO 96/41224 | 12/19/96 | WIPO | G02B 19/00 |
| WO 97/26569 | 7/24/97 | WIPO | G02B 5/18 --. |

UNITED STATES PATENT AND TRADEMARK OFFICE
CERTIFICATE OF CORRECTION

PATENT NO.   : 6,215,579 B1
DATED        : April 10, 2001
INVENTOR(S)  : David M. Bloom et al.

It is certified that error appears in the above-identified patent and that said Letters Patent is hereby corrected as shown below:

The following Other Publications need to be added:
-- T. Iwai et al., "Real-time Profiling of a Pure Phase Object Using an Auto-Wigner Distribution Function," Optics Communications, vol. 95, nos. 4-6, Jan. 15, 1993, pp 199-204.
R. Tepe, R. Gerhard-Multhaupt, W. Brinker and W, D. Molzow, "Viscoelastic Spatial Light Modulator with Active Matrix Addressing," Applied Optics, Vol. 28, No. 22, New York, USA, pp.4826-4834, Nov. 15, 1989.
W. Brinker, R. Gerhard-Multhaupt, W, D. Molzow and R. Tepe,, "Deformation Behavior of Thin Viscoelastic Layers Used in an Active-Matrix-Addressed Spatial Light Modulator," SPIE Vol. 1018, pp. 79-85, Germany, 1988.
T. Utsunomiya and H. Sato, "Electrically Deformable Echellette Grating and its Application to Tunable Laser Resonator," Electronics and Communications in Japan, Vol. 63-c, No. 10, pp. 94-100, Japan, 1980.
C. Tew, L. Hornbeck, J. Lin, E. Chiu, K. Kornher, J. Conner, K. Komatsuzaki and P. Urbanus, "Electronic Control of a Digital Micromirror Device for Projection Displays," TAM 7.5, USA. --.

Column 1,
Line 26, after "ribbons" insert -- 18 --.

Column 4,
Line 50, delete "silicon nitride 102" and insert -- silicon nitride 104 --.
Line 51, delete "oxide layer 104" and insert -- oxide layer 102 --.

UNITED STATES PATENT AND TRADEMARK OFFICE
CERTIFICATE OF CORRECTION

PATENT NO. : 6,215,579 B1
DATED : April 10, 2001
INVENTOR(S) : David M. Bloom et al.

Page 3 of 3

It is certified that error appears in the above-identified patent and that said Letters Patent is hereby corrected as shown below:

Column 8,
Line 43, between "displaying" and "adjacent", delete -- of --.

Column 11,
Line 59, delete "here" and insert -- Here --.

Signed and Sealed this

Sixth Day of November, 2001

Attest:

*Attesting Officer*

NICHOLAS P. GODICI
*Acting Director of the United States Patent and Trademark Office*